(12) United States Patent
Park et al.

(10) Patent No.: US 11,799,194 B2
(45) Date of Patent: Oct. 24, 2023

(54) ELECTRONIC DEVICE COMPRISING ANTENNA MODULE

(71) Applicant: Samsung Electronics Co., Ltd., Gyeonggi-do (KR)

(72) Inventors: Sungchul Park, Gyeonggi-do (KR); Wonjoon Choi, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/326,659

(22) Filed: May 21, 2021

(65) Prior Publication Data

US 2021/0328362 A1 Oct. 21, 2021

Related U.S. Application Data

(63) Continuation of application No. PCT/KR2019/016021, filed on Nov. 21, 2019.

(30) Foreign Application Priority Data

Nov. 23, 2018 (KR) ........................ 10-2018-0146637

(51) Int. Cl.
*H01Q 1/24* (2006.01)
*H01Q 21/06* (2006.01)
(Continued)

(52) U.S. Cl.
CPC ............. *H01Q 1/243* (2013.01); *H01Q 1/422* (2013.01); *H01Q 3/36* (2013.01); *H01Q 21/065* (2013.01)

(58) Field of Classification Search
CPC ........ H01Q 21/065; H01Q 1/422; H01Q 3/36; H01Q 1/243; H01Q 21/08; H01Q 9/0407;
(Continued)

(56) References Cited

U.S. PATENT DOCUMENTS 8,374,558 B2   2/2013   Lambrecht et al.
9,008,737 B2   4/2015   Na et al.
(Continued)

FOREIGN PATENT DOCUMENTS

CN   103095874 A   5/2013
CN   204668452 U   9/2015
(Continued)

OTHER PUBLICATIONS

European Search Report dated Jun. 29, 2022.
(Continued)

*Primary Examiner* — Ab Salam Alkassim, Jr.
(74) *Attorney, Agent, or Firm* — Cha & Reiter, LLC

(57) ABSTRACT

An electronic device, according to one embodiment of the present invention, may comprise: a first dielectric which forms at least a part of the front surface of the electronic device; a second dielectric which forms at least a part of the rear surface of the electronic device; a side surface member which surrounds a space formed between the front surface and the rear surface and of which a part comprises a third dielectric; a display positioned in the space and visually exposed through the first dielectric; and an antenna module positioned in the space. The antenna module comprises: a printed circuit board comprising a first surface which faces, in the space, the third dielectric, and a second surface which is oriented in a direction opposite to that of the first surface; and at least one antenna element which is disposed on the first surface or inside the printed circuit board so as to be adjacent to the first surface, and which forms a beam pattern toward the side surface member. In addition, other various embodiments are possible.

27 Claims, 27 Drawing Sheets

(51) Int. Cl.
*H01Q 1/42* (2006.01)
*H01Q 3/36* (2006.01)

(58) Field of Classification Search
CPC .... H01Q 1/2283; H01Q 19/027; H01Q 19/06; H04M 1/026
See application file for complete search history.

(56) References Cited

U.S. PATENT DOCUMENTS

| | | | |
|---|---|---|---|
| 9,048,542 B2 | 6/2015 | Han et al. | |
| 9,774,075 B2 | 9/2017 | Nishizaka et al. | |
| 9,998,576 B2 | 6/2018 | Kim et al. | |
| 10,084,241 B1 | 9/2018 | Jenwatanavet et al. | |
| 10,186,752 B2 | 1/2019 | Chen et al. | |
| 10,468,746 B2 | 11/2019 | Lee et al. | |
| 11,024,938 B2* | 6/2021 | Moon | H01Q 1/42 |
| 11,050,136 B2 | 6/2021 | Jung et al. | |
| 2011/0133995 A1* | 6/2011 | Pascolini | H01Q 1/243 343/702 |
| 2013/0257659 A1* | 10/2013 | Darnell | H05K 1/181 343/702 |
| 2013/0342411 A1 | 12/2013 | Jung et al. | |
| 2014/0078008 A1* | 3/2014 | Kang | H01Q 1/38 343/702 |
| 2014/0210666 A1 | 7/2014 | Maltsev et al. | |
| 2014/0300518 A1* | 10/2014 | Ramachandran | H01Q 5/371 343/702 |
| 2014/0375510 A1 | 12/2014 | Lee et al. | |
| 2015/0109170 A1* | 4/2015 | Kang | H04M 1/0277 343/702 |
| 2015/0138021 A1* | 5/2015 | Konu | H01Q 1/243 343/702 |
| 2015/0373441 A1* | 12/2015 | Behles | G06F 1/1643 381/333 |
| 2016/0118713 A1* | 4/2016 | Hong | H01Q 1/243 343/702 |
| 2016/0351998 A1 | 12/2016 | Ahn et al. | |
| 2017/0201011 A1* | 7/2017 | Khripkov | H01Q 1/42 |
| 2017/0207516 A1* | 7/2017 | Koo | H01Q 9/42 |
| 2017/0244153 A1 | 8/2017 | Chen et al. | |
| 2017/0250460 A1* | 8/2017 | Shin | H01Q 21/28 |
| 2017/0294705 A1* | 10/2017 | Khripkov | H01Q 1/38 |
| 2017/0302771 A1 | 10/2017 | Kim et al. | |
| 2017/0309991 A1 | 10/2017 | Noori et al. | |
| 2018/0026341 A1* | 1/2018 | Mow | H01Q 1/243 343/702 |
| 2018/0059298 A1* | 3/2018 | Lee | G02B 5/208 |
| 2018/0062256 A1* | 3/2018 | Kim | H01Q 13/02 |
| 2018/0090816 A1* | 3/2018 | Mow | H01Q 1/22 |
| 2018/0090826 A1* | 3/2018 | Da Costa Bras Lima | H01Q 9/04 |
| 2018/0108977 A1* | 4/2018 | Lee | H01Q 1/40 |
| 2018/0183912 A1* | 6/2018 | Lim | H04M 1/236 |
| 2018/0241115 A1* | 8/2018 | Cho | H01Q 1/36 |
| 2018/0241430 A1* | 8/2018 | Youn | H04B 1/3888 |
| 2018/0248251 A1* | 8/2018 | Son | H01Q 9/42 |
| 2018/0269561 A1* | 9/2018 | Kim | H01Q 1/085 |
| 2018/0277929 A1* | 9/2018 | Seo | H01Q 1/241 |
| 2018/0277934 A1* | 9/2018 | Kim | H01Q 1/243 |
| 2018/0287246 A1* | 10/2018 | Kim | H01Q 1/46 |
| 2018/0287302 A1* | 10/2018 | Kim | H01R 12/721 |
| 2018/0299929 A1* | 10/2018 | Kim | G06F 1/20 |
| 2018/0301792 A1* | 10/2018 | Park | H01Q 7/00 |
| 2018/0309185 A1* | 10/2018 | Akiyama | H04B 1/3827 |
| 2018/0309189 A1* | 10/2018 | Gu | H01Q 21/0025 |
| 2018/0331418 A1* | 11/2018 | Kim | B29C 45/14655 |
| 2019/0027807 A1* | 1/2019 | Choi | H01Q 5/378 |
| 2019/0027808 A1* | 1/2019 | Mow | H04R 5/04 |
| 2019/0058244 A1* | 2/2019 | Kim | H01Q 1/243 |
| 2019/0348746 A1 | 11/2019 | Gupta et al. | |
| 2020/0153115 A1* | 5/2020 | Yun | G06F 3/0412 |
| 2020/0203804 A1* | 6/2020 | Khripkov | H01Q 13/10 |
| 2020/0259251 A1* | 8/2020 | Seo | H01Q 9/0407 |
| 2020/0411978 A1* | 12/2020 | Jeon | H01Q 15/08 |
| 2021/0075091 A1* | 3/2021 | Lee | H01Q 21/067 |
| 2021/0126344 A1* | 4/2021 | Jeon | H01Q 1/38 |
| 2021/0143536 A1* | 5/2021 | Park | H01Q 1/2283 |
| 2021/0159599 A1* | 5/2021 | Park | H01Q 1/243 |
| 2021/0167487 A1* | 6/2021 | Varma | H01Q 1/243 |
| 2021/0333842 A1* | 10/2021 | Fabrega Sanchez | H01Q 1/243 |
| 2021/0376453 A1* | 12/2021 | Han | H01Q 1/243 |
| 2022/0069458 A1* | 3/2022 | Jiang | H01Q 1/38 |
| 2022/0173500 A1* | 6/2022 | Lee | H01Q 1/52 |
| 2022/0286542 A1* | 9/2022 | Seo | H04M 1/0216 |
| 2022/0311128 A1* | 9/2022 | Seo | H01Q 19/062 |
| 2023/0047210 A1* | 2/2023 | Park | H01Q 21/08 |
| 2023/0170604 A1* | 6/2023 | Jo | H01Q 21/08 343/702 |
| 2023/0176615 A1* | 6/2023 | Choi | H04M 1/0268 361/679.55 |

FOREIGN PATENT DOCUMENTS

| | | | | |
|---|---|---|---|---|
| CN | 107394350 A | 11/2017 | | |
| CN | 107681250 A | 2/2018 | | |
| CN | 107919520 A | 4/2018 | | |
| CN | 207518637 U | 6/2018 | | |
| CN | 108702403 A | 10/2018 | | |
| EP | 3196977 A1 | 7/2017 | | |
| JP | 2006108830 A | * 4/2006 | | H01Q 1/52 |
| JP | 2006-157290 A | 6/2006 | | |
| JP | 2014-143485 A | 8/2014 | | |
| JP | 2016-59077 A | 4/2016 | | |
| KR | 10-0438548 B1 | 7/2004 | | |
| KR | 10-2010-0048273 A | 5/2010 | | |
| KR | 10-2010-0061499 A | 6/2010 | | |
| KR | 10-2013-0076291 A | 7/2013 | | |
| KR | 10-2014-0148006 A | 12/2014 | | |
| KR | 10-2018-0031120 A | 3/2018 | | |
| KR | 10-2018-0097237 A | 8/2018 | | |
| KR | 10-1898059 B1 | 10/2018 | | |
| WO | 2020/004701 A1 | 1/2020 | | |

OTHER PUBLICATIONS

Korean Office Action dated Oct. 16, 2022.
Chinese Office Action dated Dec. 9, 2022.
Chinese Decision of Patent dated May 16, 2023.
Korean Decision of Patent dated Apr. 25, 2023.

* cited by examiner

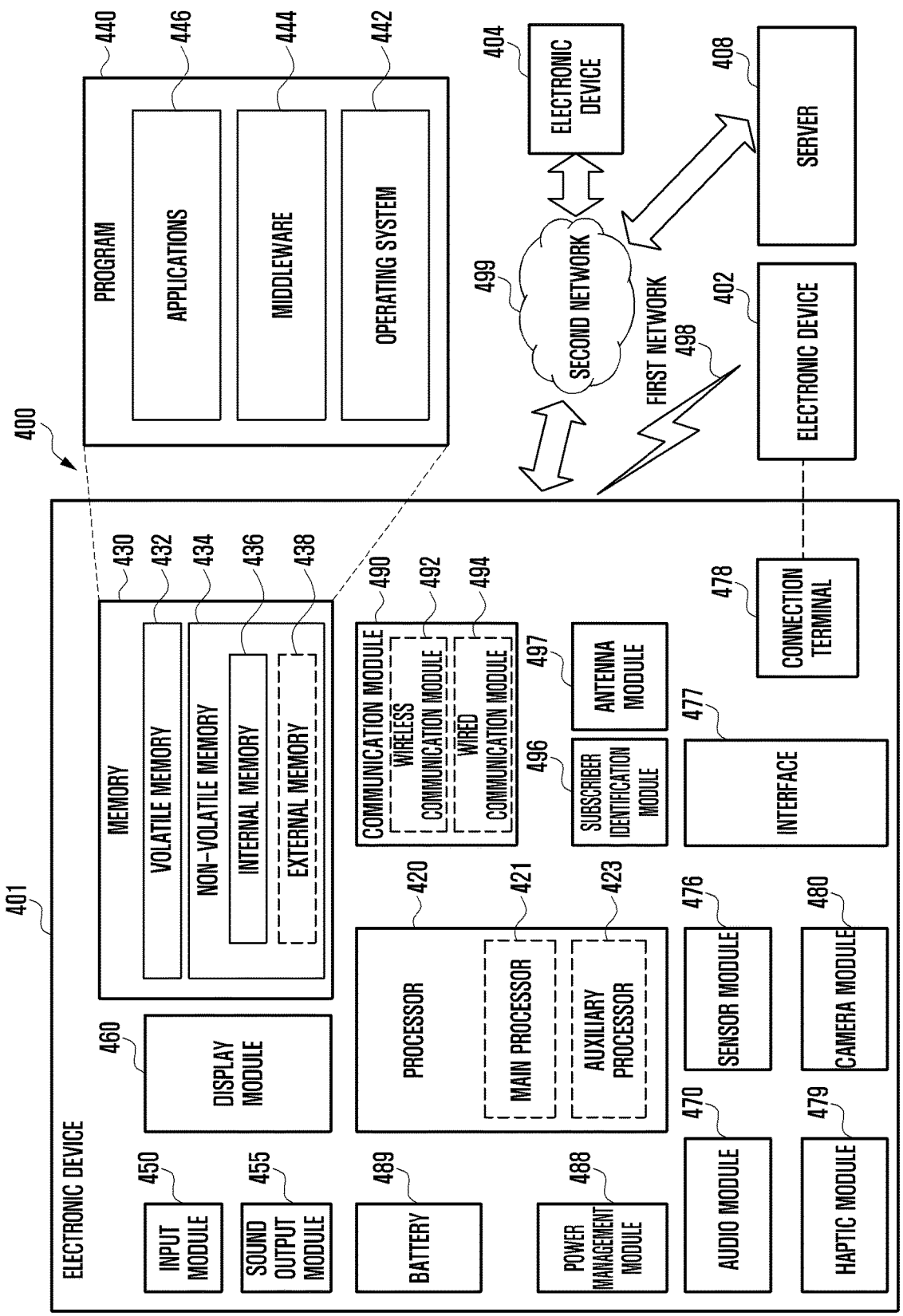

ELECTRONIC DEVICE COMPRISING ANTENNA MODULE

This application is a Continuation of a National Phase Entry of PCT International Application No. PCT/KR2019/016021, filed on Nov. 21, 2019, which is based on and claims priority under 35 U.S.C. 119 to Korean Patent Application No. 10-2018-0146637, filed on Nov. 23, 2018, in the Korean Intellectual Property Office, the disclosures of which are herein incorporated by reference in their entireties.

TECHNICAL FIELD

Various embodiments of the disclosure relate to an electronic device including an antenna module.

BACKGROUND ART

Various electronic devices may transmit/receive various kinds of data by using a wireless communication system. There has been ongoing research regarding implementation of a wireless communication system in a super-high-frequency band for various purposes, such as satisfying ever-increasing wireless data traffic demands or accomplishing high data transmission rates. Such research has been followed by efforts to effectively arranging an antenna module inside a limited electronic device such that a wireless communication system implemented in a super-high-frequency band can operate seamlessly.

DISCLOSURE OF INVENTION

Technical Problem

An electronic device may include a phased array antenna (for example, an antenna array) having a high level of directivity such that the same can seamlessly operate in a mobile environment. The electronic device may utilize a beamforming system for processing transmitted or received signals such that energy emitted from the phased array antenna is concentrated in a specific direction. The electronic device may include a conductive part (for example, a metal member) disposed on at least a part of the housing thereof in order to reinforce the rigidity or to provide an aesthetic appearance, and the phased array antenna may be disposed near the conductive part inside the housing. Such a conductive part may affect the radiation performance of the phased array antenna. For example, the beamforming system may be configured such that the corresponding beam pattern (or antenna radiation pattern) is formed through the phased array antenna disposed in the housing, but the conductive part of the housing may block radio waves radiated from the phased array antenna, thereby reducing the coverage (communication range) or deforming (or distorting) the beam pattern. In the case of transmitting or receiving radio waves which have a high level of straightness, or which are sensitive to path loss (for example, mmWave), the conductive part of the housing may make it more difficult to secure the coverage or the antenna radiation performance.

Various embodiments of the disclosure may provide an electronic device including an antenna module, which can prevent degradation of coverage or antenna radiation performance resulting from a conductive part of a housing disposed near a phased array antenna.

Solution to Problem

According to an embodiment of the disclosure, an electronic device may include: a first dielectric material forming at least a part of a front surface of the electronic device; a second dielectric material forming at least a part of a rear surface of the electronic device; a side member which surrounds a space between the front surface and the rear surface, and at least a part of which includes a third dielectric material; a display positioned in the space and visually exposed through the first dielectric material; and an antenna module which is positioned in the space, and includes: a printed circuit board including a first surface facing the third dielectric material in the space, and a second surface facing opposite to the first surface; and at least one antenna element which is disposed on the first surface or disposed in the printed circuit board to be adjacent to the first surface, and forms a beam pattern toward the side member.

Advantageous Effects of Invention

According to an embodiment of the disclosure, radiation of communication signals through a side member part of an electronic device may be implemented while securing a stable radiation performance. No boundary point of a heterogeneous material (which has a different permittivity) may not be positioned on a radiation path of an antenna element, and the radiation pattern may be formed symmetrically and uniformly. A change in the exterior of the electronic device side member may be minimized, and a uniform communication-signal radiation performance may be secured through a side surface of the electronic device while minimizing material-related restrictions.

Other advantageous effects that are obtainable or predictable from various embodiments of the disclosure will be explicitly or implicitly disclosed in the detailed description of embodiments of the disclosure. for example, various advantageous effects that are predictable from various embodiments of the disclosure will be disclosed in the following detailed description.

BRIEF DESCRIPTION OF DRAWINGS

FIG. 4 is a block diagram of an electronic device in a network environment according to various embodiments;

MODE FOR CARRYING OUT THE INVENTION

Figure 1:
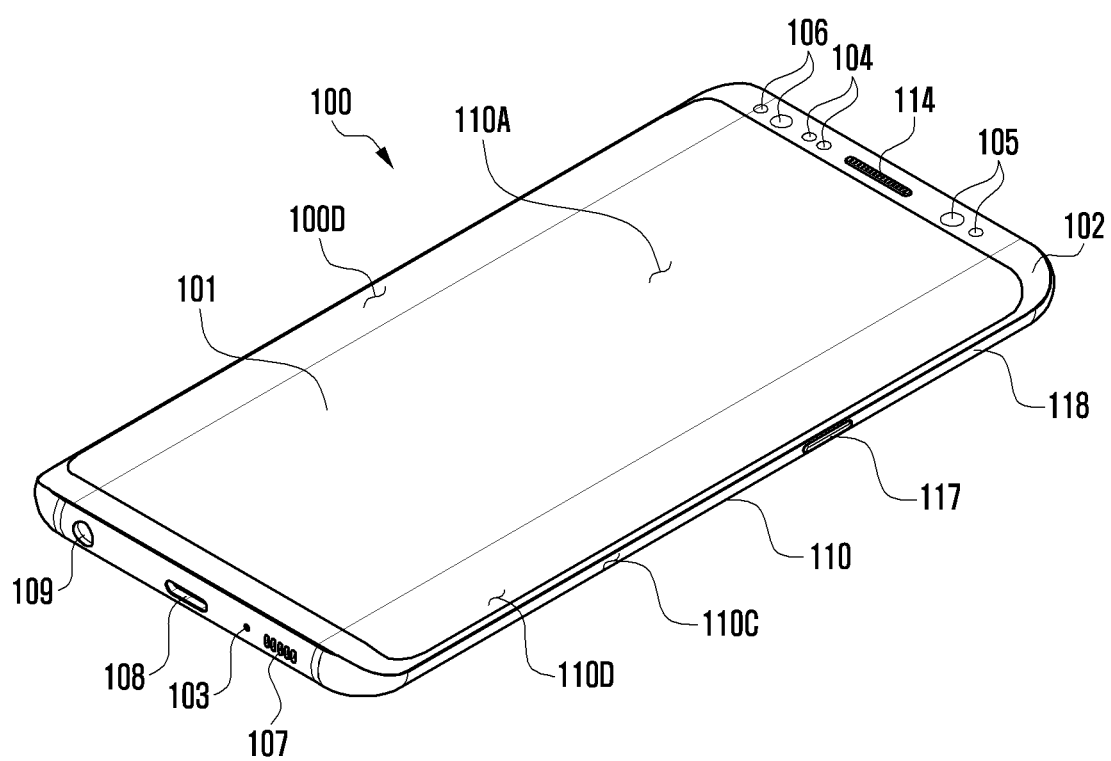
FIG. 1 is a perspective view of a front surface of a mobile electronic device according to an embodiment.
Figure 2:
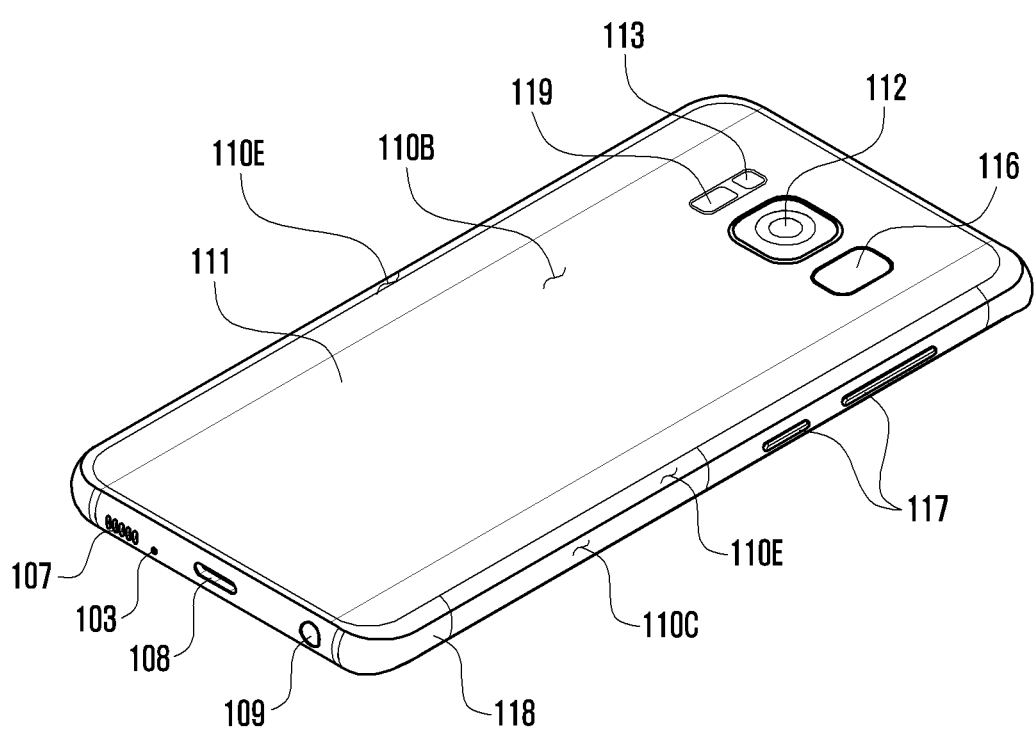
FIG. 2 is a perspective view of a rear surface of the electronic device illustrated in FIG. 1 according to an embodiment.

FIG. 1 illustrates a perspective view showing a front surface of an electronic device according to an embodiment. FIG. 2 illustrates a perspective view showing a rear surface of the electronic device shown in FIG. 1.

Referring to FIGS. 1 and 2, according to an embodiment, an electronic device 100 may include a housing 110 that includes a first surface (or front surface) 110A, a second surface (or rear surface) 110B, and a lateral surface 110C that surrounds a space between the first surface 110A and the second surface 110B. According to another embodiment (not shown), the housing 110 may refer to a structure that forms a part of the first surface 110A, the second surface 110B, and the lateral surface 110C. According to an embodiment, the first surface 110A may be formed of a front plate 102 (e.g., a glass plate or polymer plate coated with a variety of coating layers) at least a part of which is substantially transparent. The second surface 110B may be formed of a rear plate 111 which is substantially opaque. The rear plate 111 may be formed of, for example, coated or colored glass, ceramic, polymer, metal (e.g., aluminum, stainless steel (STS), or magnesium), or any combination thereof. The lateral surface 110C may be formed of a lateral bezel structure (or "lateral member") 118 which is combined with the front plate 102 and the rear plate 111 and includes a metal and/or polymer. In some embodiments, the rear plate 111 and the lateral bezel structure 118 may be integrally formed and may be of the same material (e.g., a metallic material such as aluminum).

In the shown embodiment, the front plate 102 may include two first regions 110D disposed at long edges thereof, respectively, and bent and extended seamlessly from the first surface 110A toward the rear plate 111. In the shown embodiment, the rear plate 111 may include two second regions 110E disposed at long edges thereof, respectively, and bent and extended seamlessly from the second surface 110B toward the front plate 102 (refer to FIG. 2). In some embodiments, the front plate 102 (or the rear plate 111) may include only one of the first regions 110D (or of the second regions 110E). In another embodiment, the first regions 110D or the second regions 110E may be omitted in part. In the embodiments, when viewed from a lateral side of the electronic device 100, the lateral bezel structure 118 may have a first thickness (or width) on a lateral side where the first region 110D or the second region 110E is not included, and may have a second thickness, being less than the first thickness, on another lateral side where the first region 110D or the second region 110E is included.

According to an embodiment, the electronic device 100 may include at least one of a display 101, audio modules 103, 107 and 114, sensor modules 104, 116 and 119, camera modules 105, 112 and 113, key input devices 117, a light emitting device 106, and connector holes 108 and 109. In some embodiments, the electronic device 100 may omit at least one (e.g., the key input devices 117 or the light emitting device 106) of the above components, or may further include other components.

The display 101 may be exposed through a substantial portion of the front plate 102, for example. In some embodiments, at least a part of the display 101 may be exposed through the front plate 102 that forms the first surface 110A and the first region 110D of the lateral surface 110C. In some embodiments, outlines of the display 101 may have substantially the same form as those of the front plate 102. In another embodiment (not shown), the spacing between the outline of the display 101 and the outline of the front plate 102 may be substantially unchanged in order to enlarge the exposed area of the display 101.

In another embodiment (not shown), a recess or opening may be formed in a portion of a display area of the display 101 to accommodate at least one of the audio module 114, the sensor module 104, the camera module 105, and the light emitting device 106. In another embodiment (not shown), at least one of the audio module 114, the sensor module 104, the camera module 105, the fingerprint sensor 116, and the light emitting element 106 may be disposed on the back of the display area of the display 101. In another embodiment (not shown), the display 101 may be combined with, or adjacent to, a touch sensing circuit, a pressure sensor capable of measuring the touch strength (pressure), and/or a digitizer for detecting a stylus pen. In some embodiments, at least a part of the sensor modules 104 and 119 and/or at least a part of the key input devices 117 may be disposed in the first region 110D and/or the second region 110E.

The audio modules 103, 107 and 114 may correspond to a microphone hole 103 and speaker holes 107 and 114, respectively. The microphone hole 103 may contain a microphone disposed therein for acquiring external sounds and, in a case, contain a plurality of microphones to sense a sound direction. The speaker holes 107 and 114 may be classified into an external speaker hole 107 and a call receiver hole 114. In various embodiments, the microphone hole 103 and the speaker holes 107 and 114 may be implemented as a single hole, or a speaker (e.g., a piezo speaker) may be provided without the speaker holes 107 and 114.

The sensor modules 104, 116 and 119 may generate electrical signals or data corresponding to an internal operating state of the electronic device 100 or to an external environmental condition. The sensor modules 104, 116 and 119 may include a first sensor module 104 (e.g., a proximity sensor) and/or a second sensor module (e.g., a fingerprint sensor) disposed on the first surface 110A of the housing 110, and/or a third sensor module 119 (e.g., a heart rate monitor (HRM) sensor) and/or a fourth sensor module 116 (e.g., a fingerprint sensor) disposed on the second surface 110B of the housing 110. The fingerprint sensor may be disposed on the second surface 110B as well as the first surface 110A (e.g., the display 101) of the housing 110. The electronic device 100 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 105, 112 and 113 may include a first camera device 105 disposed on the first surface 110A of the electronic device 100, and a second camera device 112 and/or a flash 113 disposed on the second surface 110B. The first camera device 105 and the second camera device 112 may include one or more lenses, an image sensor, and/or an image signal processor. The flash 113 may include, for example, a light emitting diode or a xenon lamp. In some embodiments, two or more lenses (infrared cameras, wide angle and telephoto lenses) and image sensors may be disposed on one side of the electronic device 100.

The key input devices 117 may be disposed on the lateral surface 110C of the housing 110. In another embodiment, the electronic device 100 may not include some or all of the key input devices 117 described above, and the key input devices 117 which are not included may be implemented in another form such as a soft key on the display 101. In various embodiments, the key input devices 117 may include the sensor module 116 disposed on the second surface 110B of the housing 110.

The light emitting device 106 may be disposed on the first surface 110A of the housing 110, for example. For example, the light emitting device 106 may provide status information of the electronic device 100 in an optical form. In another embodiment, the light emitting device 106 may provide a light source associated with the operation of the camera module 105. The light emitting device 106 may include, for example, a light emitting diode (LED), an IR LED, or a xenon lamp.

The connector holes 108 and 109 may include a first connector hole 108 adapted for a connector (e.g., a universal serial bus (USB) connector) for transmitting and receiving power and/or data to and from an external electronic device, and/or a second connector hole 109 adapted for a connector (e.g., an earphone jack) for transmitting and receiving an audio signal to and from an external electronic device.

Figure 3:
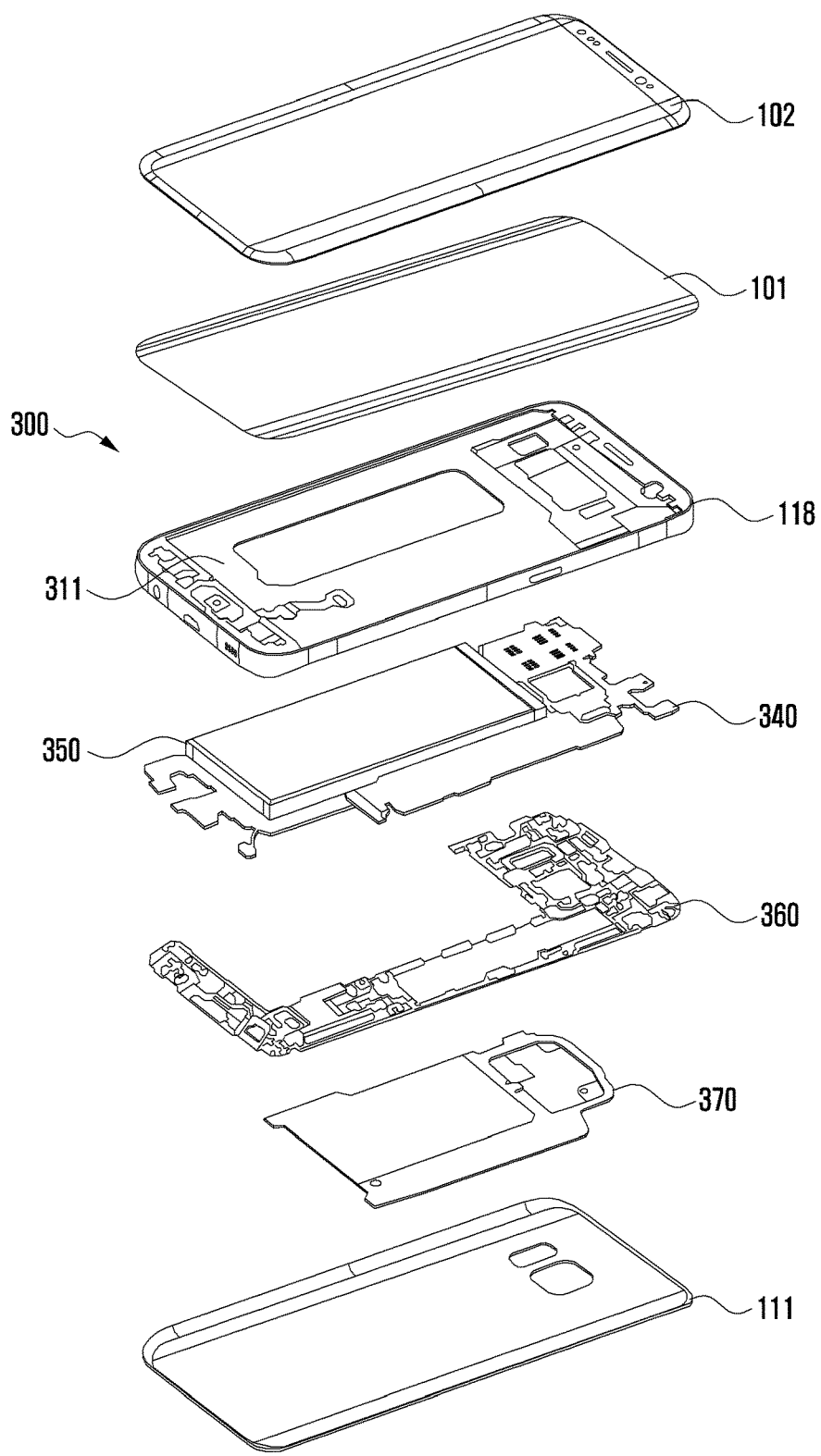
FIG. 3 is an exploded perspective view of the electronic device illustrated in FIG. 1 according to an embodiment.

FIG. 3 illustrates an exploded perspective view showing the electronic device shown in FIGS. 1 and 2.

Referring to FIG. 3, the electronic device 100 may include the lateral bezel structure 118, a first support member 311 (e.g., a bracket), the front plate 102, the display 101, a printed circuit board (PCB) 340, a battery 350, a second support member 360 (e.g., a rear case), an antenna 370, or the rear plate 111. In some embodiments, the electronic device 100 may omit at least one (e.g., the first support member 311 or the second support member 360) of the above components or may further include another component. Some components of the electronic device 100 may be the same as or similar to those of the electronic device 100 shown in FIG. 1 or FIG. 2, thus, descriptions thereof are omitted below.

The first support member 311 is disposed inside the electronic device 100 and may be connected to, or integrated with, the lateral bezel structure 118. The first support member 311 may be formed of, for example, a metallic material and/or a non-metal (e.g., polymer) material. The first support member 311 may be combined with the display 101 at one side thereof and also combined with the PCB 340 at the other side thereof. On the PCB 340, a processor, a memory, and/or an interface may be mounted.

The processor may include, for example, one or more of a central processing unit (CPU), an application processor (AP), a graphics processing unit (GPU), an image signal processor (ISP), a sensor hub processor, or a communications processor (CP).

The memory may include, for example, volatile memory or non-volatile memory.

The interface may include, for example, a high definition multimedia interface (HDMI), a USB interface, a secure digital (SD) card interface, and/or an audio interface. The interface may electrically or physically connect the electronic device 300 with an external electronic device and may include a USB connector, an SD card/multimedia card (MMC) connector, or an audio connector.

The battery 350 is a device for supplying power to at least one component of the electronic device 100, and may include, for example, a non-rechargeable primary battery, a rechargeable secondary battery, or a fuel cell. At least a part of the battery 350 may be disposed on substantially the same plane as the PCB 340. The battery 350 may be integrally disposed within the electronic device 100, and may be detachably disposed from the electronic device 100.

The antenna 370 may be disposed between the rear plate 111 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly. In another embodiment, an antenna structure may be formed by a part or combination of the lateral bezel structure 118 and/or the first support member 311.

FIG. 4 is a block diagram illustrating an electronic device 401 in a network environment 400 according to various embodiments.

Referring to FIG. 4, the electronic device 401 in the network environment 400 may communicate with an electronic device 402 via a first network 498 (e.g., a short-range wireless communication network), or an electronic device 404 or a server 408 via a second network 499 (e.g., a long-range wireless communication network). According to an embodiment, the electronic device 401 may communicate with the electronic device 404 via the server 408. According to an embodiment, the electronic device 401 may include a processor 420, memory 430, an input device 450, a sound output device 455, a display device 460, an audio module 470, a sensor module 476, an interface 477, a haptic module 479, a camera module 480, a power management module 488, a battery 489, a communication module 490, a subscriber identification module (SIM) 496, or an antenna module 497. In some embodiments, at least one (e.g., the display device 460 or the camera module 480) of the components may be omitted from the electronic device 401, or one or more other components may be added in the electronic device 401. In some embodiments, some of the components may be implemented as single integrated circuitry. For example, the sensor module 476 (e.g., a fingerprint sensor, an iris sensor, or an illuminance sensor) may be implemented as embedded in the display device 460 (e.g., a display). In various embodiments, the electronic device 401 may be the electronic device 100 of FIG. 1, 2, or 3.

The processor 420 may execute, for example, software (e.g., a program 440) to control at least one other component (e.g., a hardware or software component) of the electronic device 401 coupled with the processor 420, and may perform various data processing or computation. According to one embodiment, as at least part of the data processing or computation, the processor 420 may load a command or data received from another component (e.g., the sensor module 476 or the communication module 490) in volatile memory 432, process the command or the data stored in the volatile memory 432, and store resulting data in non-volatile memory 434. According to an embodiment, the processor 420 may include a main processor 421 (e.g., a central processing unit (CPU) or an application processor (AP)), and an auxiliary processor 423 (e.g., a graphics processing unit (GPU), an image signal processor (ISP), a sensor hub processor, or a communication processor (CP)) that is operable independently from, or in conjunction with, the main processor 421. Additionally or alternatively, the auxiliary processor 423 may be adapted to consume less power than the main processor 421, or to be specific to a specified function. The auxiliary processor 423 may be implemented as separate from, or as part of the main processor 421.

The auxiliary processor 423 may control at least some of functions or states related to at least one component (e.g., the display device 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). According to an embodiment, the auxiliary processor 423 (e.g., an image signal processor or a communication processor) may be implemented as part of another component (e.g., the camera module 480 or the communication module 490) functionally related to the auxiliary processor 423.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446.

The input device 450 may receive a command or data to be used by other component (e.g., the processor 420) of the electronic device 401, from the outside (e.g., a user) of the electronic device 401. The input device 450 may include, for example, a microphone, a mouse, a keyboard, or a digital pen (e.g., a stylus pen).

The sound output device 455 may output sound signals to the outside of the electronic device 401. The sound output device 455 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 460 may visually provide information to the outside (e.g., a user) of the electronic device 401. The display device 460 may include, for example, a display, a hologram device, or a projector and control circuitry to control a corresponding one of the display, hologram device, and projector. According to an embodiment, the display device 460 may include touch circuitry adapted to detect a touch, or sensor circuitry (e.g., a pressure sensor) adapted to measure the intensity of force incurred by the touch.

The audio module 470 may convert a sound into an electrical signal and vice versa. According to an embodiment, the audio module 470 may obtain the sound via the input device 450, or output the sound via the sound output device 455 or a headphone of an external electronic device (e.g., an electronic device 402) directly or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. According to an embodiment, the sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device (e.g., the electronic device 402) directly or wirelessly. According to an embodiment, the interface 477 may include, for example, a high definition multimedia interface (HDMI), a universal serial bus (USB) interface, a secure digital (SD) card interface, or an audio interface.

A connecting terminal 478 may include a connector via which the electronic device 401 may be physically connected with the external electronic device (e.g., the electronic device 402). According to an embodiment, the connecting terminal 478 may include, for example, a HDMI connector, a USB connector, a SD card connector, or an audio connector (e.g., a headphone connector).

The haptic module 479 may convert an electrical signal into a mechanical stimulus (e.g., a vibration or a movement) or electrical stimulus which may be recognized by a user via his tactile sensation or kinesthetic sensation. According to an embodiment, the haptic module 479 may include, for example, a motor, a piezoelectric element, or an electric stimulator.

The camera module 480 may capture a still image or moving images. According to an embodiment, the camera module 480 may include one or more lenses, image sensors, image signal processors, or flashes.

The power management module 488 may manage power supplied to the electronic device 401. According to one embodiment, the power management module 488 may be implemented as at least part of, for example, a power management integrated circuit (PMIC).

The battery 489 may supply power to at least one component of the electronic device 401. According to an embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the application processor (AP)) and supports a direct (e.g., wired) communication or a wireless communication. According to an embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device via the first network 498 (e.g., a short-range communication network, such as Bluetooth™, wireless-fidelity (Wi-Fi) direct, or infrared data association (IrDA)) or the second network 499 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 492 may identify and authenticate the electronic device 401 in a communication network, such as the first network 498 or the second network 499, using subscriber information (e.g., international mobile subscriber identity (IMSI)) stored in the subscriber identification module 496.

The antenna module 497 may transmit or receive a signal or power to or from the outside (e.g., the external electronic device) of the electronic device 401. According to an embodiment, the antenna module 497 may include an antenna including a radiating element composed of a conductive material or a conductive pattern formed in or on a substrate (e.g., PCB). According to an embodiment, the antenna module 497 may include a plurality of antennas. In such a case, at least one antenna appropriate for a communication scheme used in the communication network, such as the first network 498 or the second network 499, may be selected, for example, by the communication module 490 (e.g., the wireless communication module 492) from the plurality of antennas. The signal or the power may then be transmitted or received between the communication module 490 and the external electronic device via the selected at least one antenna. According to an embodiment, another component (e.g., a radio frequency integrated circuit (RFIC)) other than the radiating element may be additionally formed as part of the antenna module 497.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 401 and the external electronic device 404 via the server 408 coupled with the second network 499. Each of the electronic devices 402 and 404 may be a device of a same type as, or a different type, from the electronic device 401. According to an embodiment, all or some of operations to be executed at the electronic device 401 may be executed at one or more of the external electronic devices 402, 404, or 408. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 440) including one or more instructions that are stored in a storage medium (e.g., internal memory 436 or external memory 438) that is readable by a machine (e.g., the electronic device 401). For example, a processor (e.g., the processor 420) of the machine (e.g., the electronic device 401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 5A:
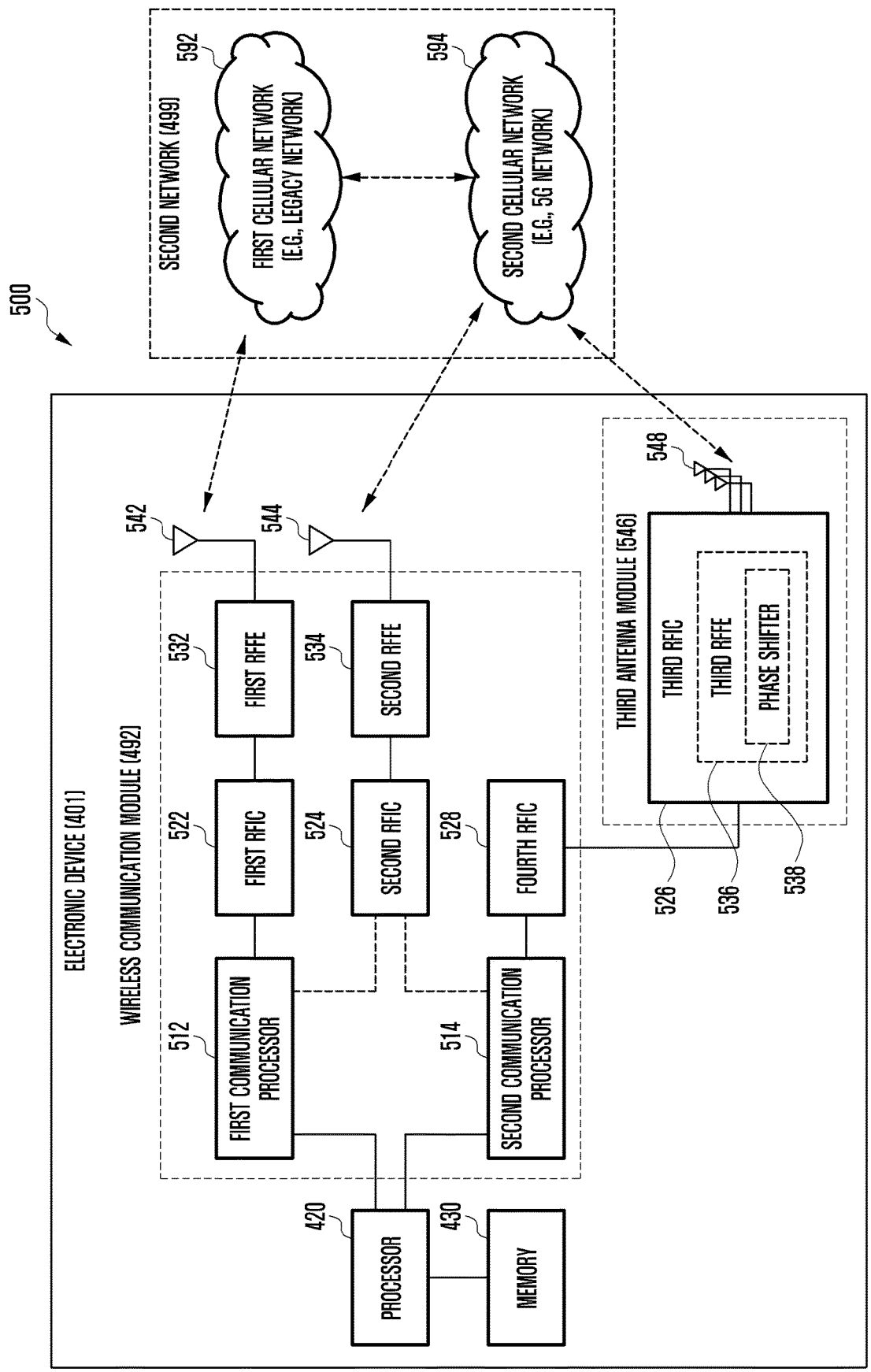
FIG. 5A is a block diagram of an electronic device in network environment including multiple cellular networks according to various embodiments.

FIG. 5A is a block diagram 500 illustrating an electronic device 401 in a network environment including a plurality of cellular networks according to various embodiments of the disclosure.

Referring to FIG. 5A, the electronic device 401 may include a first communication processor 512, second communication processor 514, first RFIC 522, second RFIC 524, third RFIC 526, fourth RFIC 528, first radio frequency front end (RFFE) 532, second RFFE 534, first antenna module 542, second antenna module 544, or antenna 548. The electronic device 401 may include the processor 420 and the memory 430. A second network 499 may include a first cellular network 592 and a second cellular network 594. According to another embodiment, the electronic device 401 may further include at least one of the components described with reference to FIG. 4, and the second network 499 may further include at least one other network. According to one embodiment, the first communication processor 512, second communication processor 514, first RFIC 522, second RFIC 524, fourth RFIC 528, first RFFE 532, and second RFFE 534 may form at least part of the wireless communication module 492. According to another embodiment, the fourth RFIC 528 may be omitted or included as part of the third RFIC 526.

The first communication processor 512 may establish a communication channel of a band to be used for wireless communication with the first cellular network 592 and support legacy network communication through the established communication channel. According to various embodiments, the first cellular network may be a legacy network including a second generation (2G), 3G, 4G, or long term evolution (LTE) network. The second communication processor 514 may establish a communication channel corresponding to a designated band (e.g., about 6 GHz to about 60 GHz) of bands to be used for wireless communication with the second cellular network 594, and support 5G network communication through the established communication channel. According to various embodiments, the second cellular network 594 may be a 5G network defined in 3GPP. Additionally, according to an embodiment, the first communication processor 512 or the second communication processor 514 may establish a communication channel corresponding to another designated band (e.g., about 6 GHz or less) of bands to be used for wireless communication with the second cellular network 594 and support 5G network communication through the established communication channel. According to one embodiment, the first communication processor 512 and the second communication processor 514 may be implemented in a single chip or a single package. According to various embodiments, the first communication processor 512 or the second communication processor 514 may be formed in a single chip or a single package with the processor 420, the auxiliary processor 423, or the communication module 490 (see FIG. 5). According to an embodiment, the first communication processor 512 and the second communication processor 514 may be connected directly or indirectly each other by interfaces (not shown), and may transmit or receive data or control signals in one-way communication or two-way communication.

Upon transmission, the first RFIC 522 may convert a baseband signal generated by the first communication processor 512 to a radio frequency (RF) signal of about 700 MHz to about 3 GHz used in the first cellular network 592 (e.g., legacy network). Upon reception, an RF signal may be obtained from the first cellular network 592 (e.g., legacy network) through an antenna (e.g., the first antenna module 542) and be preprocessed through an RFFE (e.g., the first RFFE 532). The first RFIC 522 may convert the preprocessed RF signal to a baseband signal so as to be processed by the first communication processor 512.

Upon transmission, the second RFIC 524 may convert a baseband signal generated by the first communication processor 512 or the second communication processor 514 to an RF signal (hereinafter, 5G Sub6 RF signal) of a Sub6 band (e.g., 6 GHz or less) to be used in the second cellular network 594 (e.g., 5G network). Upon reception, a 5G Sub6 RF signal may be obtained from the second cellular network 594 (e.g., 5G network) through an antenna (e.g., the second antenna module 544) and be pretreated through an RFFE (e.g., the second RFFE 534). The second RFIC 524 may convert the preprocessed 5G Sub6 RF signal to a baseband signal so as to be processed by a corresponding communication processor of the first communication processor 512 or the second communication processor 514.

The third RFIC 526 may convert a baseband signal generated by the second communication processor 514 to an RF signal (hereinafter, 5G Above6 RF signal) of a 5G Above6 band (e.g., about 6 GHz to about 60 GHz) to be used in the second cellular network 594 (e.g., 5G network). Upon reception, a 5G Above6 RF signal may be obtained from the second cellular network 594 (e.g., 5G network) through an antenna (e.g., the antenna 548) and be preprocessed through the third RFFE 536. The third RFIC 526 may convert the preprocessed 5G Above6 RF signal to a baseband signal so as to be processed by the second communication processor 514. According to one embodiment, the third RFFE 536 may be formed as part of the third RFIC 526.

According to an embodiment, the electronic device 401 may include a fourth RFIC 528 separately from the third RFIC 526 or as at least part of the third RFIC 526. In this case, the fourth RFIC 528 may convert a baseband signal generated by the second communication processor 514 to an RF signal (hereinafter, an intermediate frequency (IF) signal) of an intermediate frequency band (e.g., about 9 GHz to about 11 GHz) and transfer the IF signal to the third RFIC 526. The third RFIC 526 may convert the IF signal to a 5G Above 6RF signal. Upon reception, the 5G Above 6RF signal may be received from the second cellular network 594 (e.g., a 5G network) through an antenna (e.g., the antenna 548) and be converted to an IF signal by the third RFIC 526. The fourth RFIC 528 may convert an IF signal to a baseband signal so as to be processed by the second communication processor 514.

According to one embodiment, the first RFIC 522 and the second RFIC 524 may be implemented into at least part of a single package or a single chip. According to one embodiment, the first RFFE 532 and the second RFFE 534 may be implemented into at least part of a single package or a single chip. According to one embodiment, at least one of the first antenna module 542 or the second antenna module 544 may be omitted or may be combined with another antenna module to process RF signals of a corresponding plurality of bands.

According to one embodiment, the third RFIC 526 and the antenna 548 may be disposed at the same substrate to form a third antenna module 546. For example, the wireless communication module 492 or the processor 420 may be disposed at a first substrate (e.g., main PCB). In this case, the third RFIC 526 is disposed in a partial area (e.g., lower surface) of the first substrate and a separate second substrate (e.g., sub PCB), and the antenna 548 is disposed in another partial area (e.g., upper surface) thereof; thus, the third antenna module 546 may be formed. By disposing the third RFIC 526 and the antenna 548 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 401 may improve a quality or speed of communication with the second cellular network 594 (e.g., 5G network).

According to one embodiment, the antenna 548 may be formed in an antenna array including a plurality of antenna elements that may be used for beamforming. In this case, the third RFIC 526 may include a plurality of phase shifters 538 corresponding to a plurality of antenna elements, for example, as part of the third RFFE 536. Upon transmission, each of the plurality of phase shifters 538 may convert a phase of a 5G Above6 RF signal to be transmitted to the outside (e.g., a base station of a 5G network) of the electronic device 401 through a corresponding antenna element. Upon reception, each of the plurality of phase shifters 538 may convert a phase of the 5G Above6 RF signal received from the outside to the same phase or substantially the same phase through a corresponding antenna element. This enables transmission or reception through beamforming between the electronic device 401 and the outside.

The second cellular network 594 (e.g., 5G network) may operate (e.g., stand-alone (SA)) independently of the first cellular network 592 (e.g., legacy network) or may be operated (e.g., non-stand alone (NSA)) in connection with the first cellular network 592. For example, the 5G network may have only an access network (e.g., 5G radio access network (RAN) or a next generation (NG) RAN and have no core network (e.g., next generation core (NGC)). In this case, after accessing to the access network of the 5G network, the electronic device 401 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 430 to be accessed by other components (e.g., the processor 420, the first communication processor 512, or the second communication processor 514).

Figure 5B:
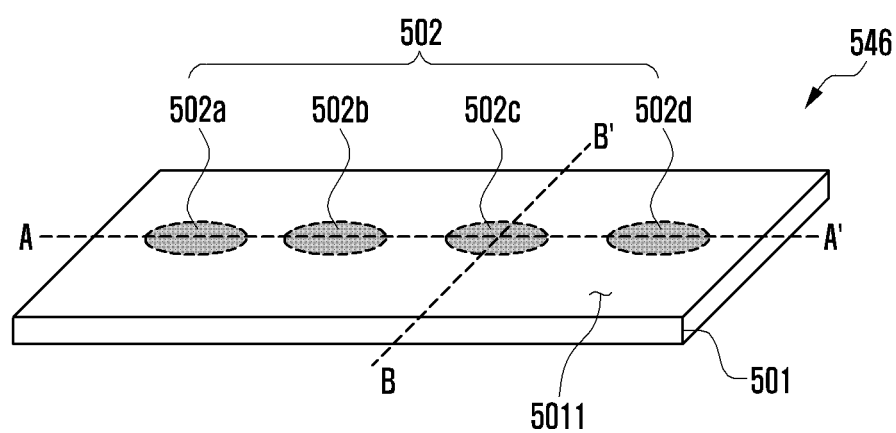
FIG. 5B is a perspective view of a front surface of a third antenna module illustrated in FIG. 5A according to an embodiment.
Figure 5C:
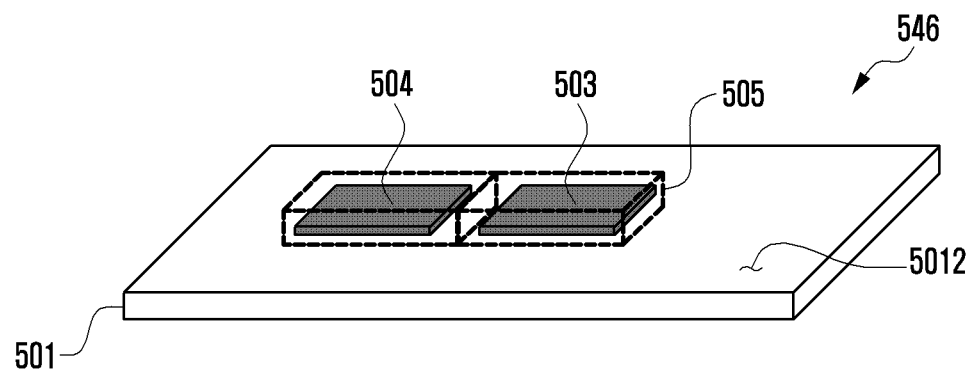
FIG. 5C is a perspective view of a rear surface of the third antenna module illustrated in FIG. 5B according to an embodiment.
Figure 5D:
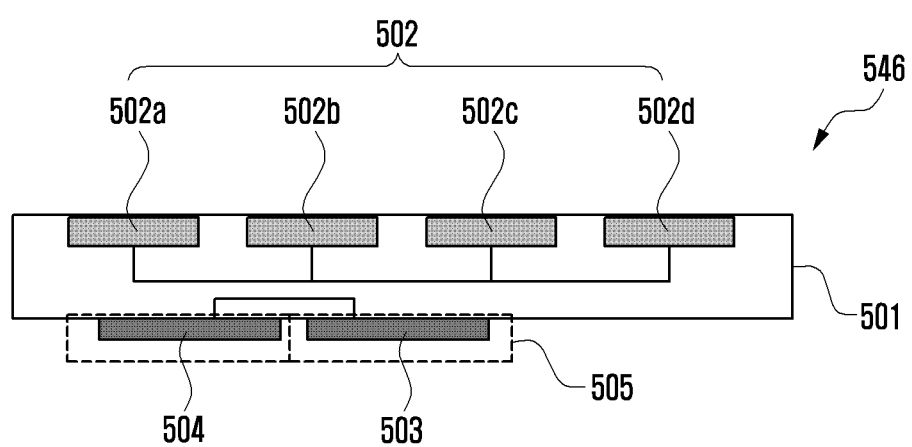
FIG. 5D is a cross sectional view of the third antenna module in FIG. 5B along line A-A' according to an embodiment.

FIG. 5B is a perspective view of a front surface of a third antenna module 546 illustrated in FIG. 5A according to an embodiment. FIG. 5C is a perspective view of a rear surface of the third antenna module 546 illustrated in FIG. 5B according to an embodiment. FIG. 5D is a cross sectional view of the third antenna module 546 in FIG. 5B along line A-A' according to an embodiment.

Referring to FIG. 5B, in an embodiment, the third antenna module 546 may include a printed circuit board 501, an antenna array 502, and a radio frequency integrated circuit (RFIC) 503 or a power management integrated circuit 504. Selectively, the third antenna module 546 may further include a shielding member 505. In another embodiment, at least one of the above mentioned components may be omitted, or at least two of the components may be integrated.

According to an embodiment, the printed circuit board 501 may include multiple conductive layers and multiple non-conductive layers alternately stacked with the multiple conductive layers. The printed circuit board 501 may provide electrical connection between various electronic components positioned on the printed circuit board 501 and/or positioned at the outside, by using conductive vias and wires arranged on the conductive layers.

According to an embodiment, the antenna array 502 (e.g., the antenna 548 in FIG. 5A) may include multiple antenna elements 502a, 502b, 502c, and 502d forming a directional beam. The antenna elements 502a, 502b, 502c, and 502d may be located on a first surface 5011 of the printed circuit board 501, as illustrated. According to another embodiment, the antenna array 502 may be located inside the printed circuit board 501 to be adjacent to the first surface 5011. According to various embodiments, the antenna array 502 may include multiple antenna arrays (e.g., a patch antenna array and/or a dipole antenna array) which have identical or different shapes, or are of identical or different types.

According to an embodiment, the RFIC 503 (e.g., the third RFIC 526 in FIG. 5A) may be located in another area of the printed circuit board 501, which is spaced apart from the antenna array 502. For example, the RFIC 503 may be located in a second surface 5012 of the printed circuit board 501, which faces opposite to the first surface 5011. The RFIC 503 may be implemented to process a signal within a selected frequency band, which is transmitted and/or received through the antenna array 502. According to an embodiment, the RFIC 503 may convert a baseband signal obtained from a communication processor (not illustrated) into an RF signal within a designated band at the time of transmission. At the time of reception, the RFIC 503 may convert an RF signal received through the antenna array 502 into a baseband signal, and transfer the baseband signal to a communication processor.

According to another embodiment, at the time of transmission, the RFIC 503 may up-convert an IF signal (e.g., about 9 GHz-11 GHz) obtained from an intermediate frequency integrated circuit (IFIC) (e.g., the fourth RFIC 528 in FIG. 5A) into an RF signal within a selected band. At the time of reception, the RFIC 503 may down-convert an RF signal obtained through the antenna array 502 into an IF signal, and transfer the IF signal to the IFIC.

According to an embodiment, the PMIC 504 may be located in another partial area (e.g., the second surface 5012) of the printed circuit board 501, which is spaced apart from the antenna array 502. The PMIC 504 may receive power supplied from a main printed circuit board (e.g., the printed circuit board 340 in FIG. 3), to provide the power required for various components (e.g., the RFIC 503) of the third antenna module 546.

According to an embodiment, the shielding member 505 may be located on the second surface 5012 of the printed circuit board 501 to electromagnetically shield at least one of the RFIC 503 or the PMIC 504. The shielding member 505 may include, for example, a conductive member, such as a shield can. As another example, the shielding member 505 may include a protection member, such as urethane resin, and a conductive paint, such as an EMI paint, applied to an outside surface of the protection member. According to various embodiments, the shielding member 505 may be implemented by various shielding sheets located to cover the second surface 5012.

Although not illustrated, in various embodiments, the third antenna module 546 may be electrically connected to another printed circuit board (e.g., the printed circuit board 340 in FIG. 3) through a module interface. The module interface may include a connection member, for example, a coaxial cable connector, a board-to-board connector, an interposer, or a flexible printed circuit board (FPCB). The RFIC 503 and/or the PMIC 504 of the third antenna module 546 may be electrically connected to the printed circuit board through the connection member.

Figure 5E:
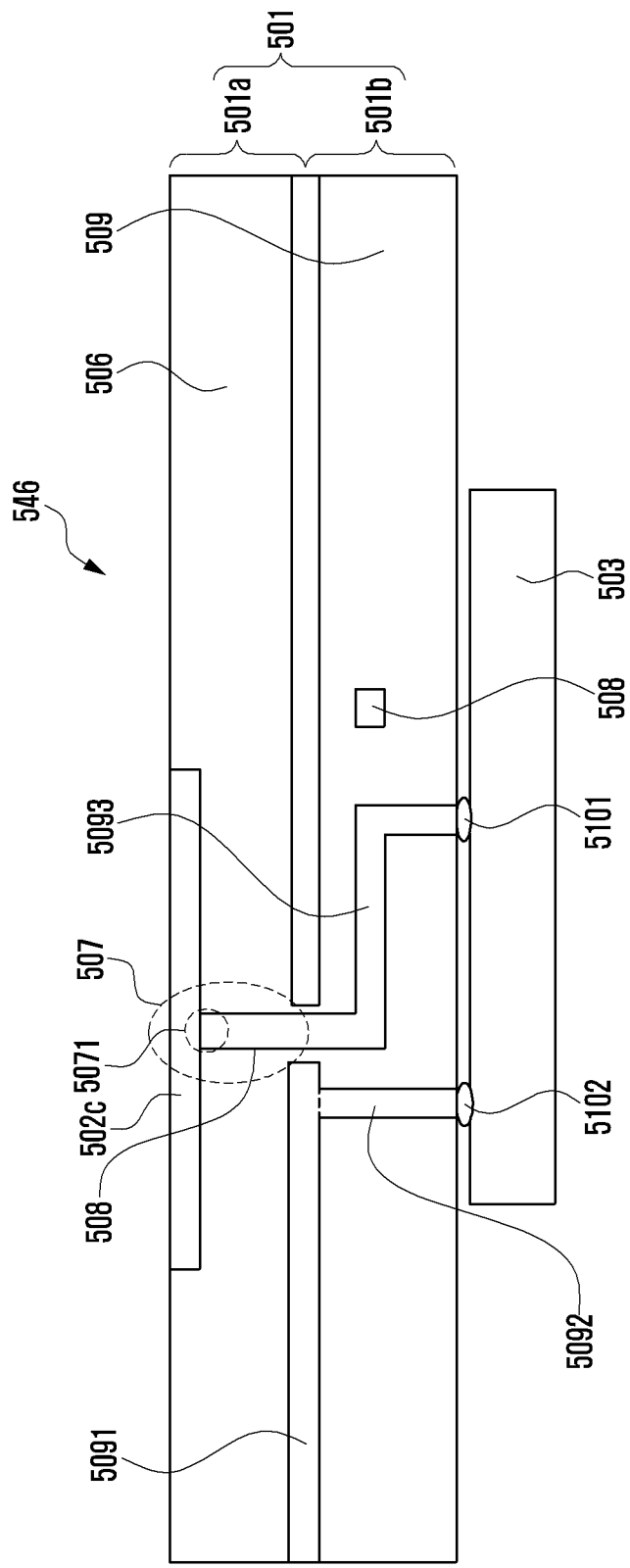
FIG. 5E is a cross sectional view of the third antenna module in FIG. 5B along line B-B' according to an embodiment.

FIG. 5E is a cross sectional view of the third antenna module 546 in FIG. 5B along line B-B' according to an embodiment.

Referring to FIG. 5E, the printed circuit board 501 may include an antenna layer 501a and a network layer 501b.

According to an embodiment, the antenna layer 501a may include at least one dielectric layer 506 and an antenna element 502c and/or a feeding part 507 disposed on an external surface of the dielectric layer or disposed inside the dielectric layer. The feeding part 507 may include a feeding point 5071 and/or a feeding line 508. According to an embodiment, the network layer 501b may include: at least one dielectric layer 509; at least one ground layer 5091 disposed on an external surface of the dielectric layer 509 or disposed inside the dielectric layer; at least one conductive via 5092; a transmission line 5093; and/or a signal line (e.g., a feeding line) 508.

According to an embodiment, the RFIC 503 may be electrically connected to the network layer 501b through first and second connection parts (e.g., solder bumps) 5101 and 5102. According to other embodiments, various connection structures (e.g., solder or BGA) may be used instead of the connection parts. The RFIC 503 may be electrically connected to the antenna element 502c through the first connection part 5101, the transmission line 5093, and the feeding part 507. The RFIC 503 may also be electrically connected to the ground layer 5091 through the second connection part 5102 and the conductive via 5092. Although not illustrated, the RFIC 503 may be electrically connected to the module interface mentioned above, through the signal line 508.

Figure 6:
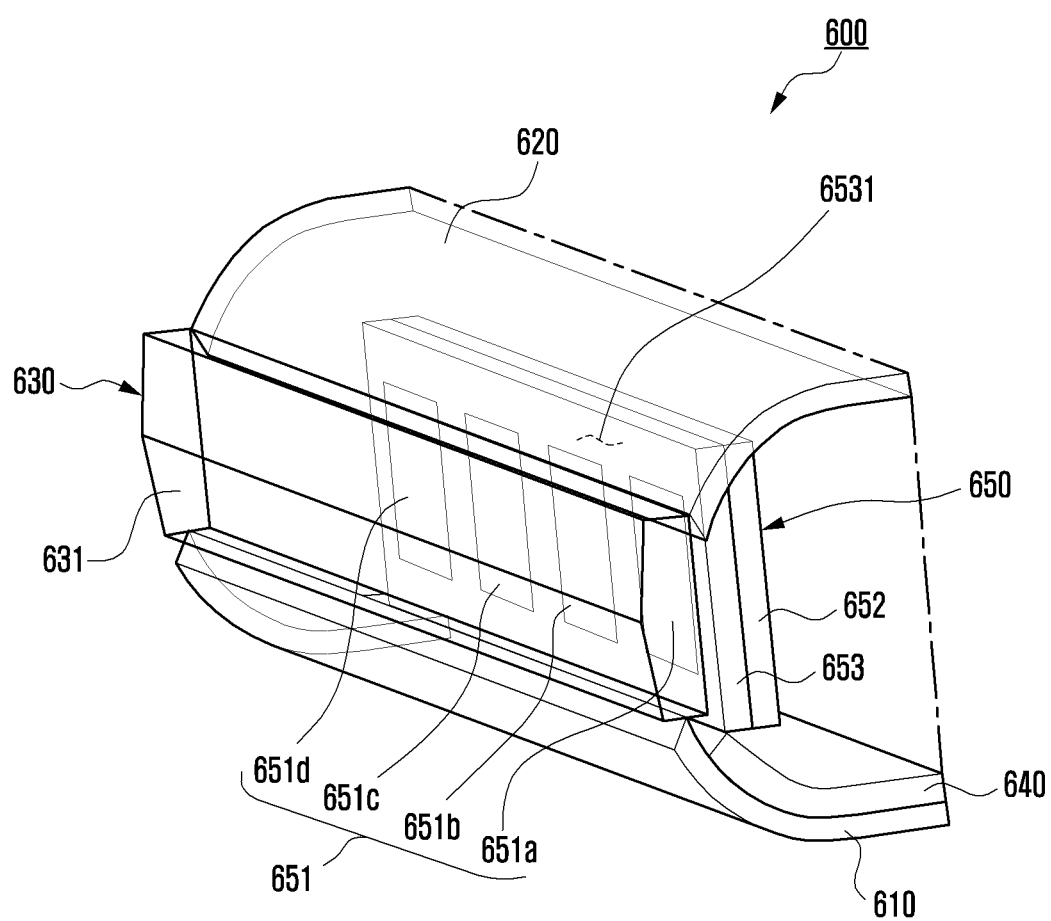
FIG. 6 is a view of an electronic device which emits radio waves (or energy) through a side surface of the electronic device according to an embodiment.

FIG. 6 is a view of an electronic device 600 which emits radio waves (or energy) through a side surface of the electronic device 600 according to an embodiment.

According to an embodiment, the electronic device 600 may include a first glass 610, a second glass 620, a side member 630, a display 640 (e.g., the display 101 in FIG. 1 or FIG. 3), or an antenna module 650.

According to an embodiment, the first glass 610 may form at least a part of a front surface (e.g., the front surface 110A in FIG. 1) of the electronic device 600. The first glass 610 may correspond to, for example, a front plate 102 illustrated in FIG. 1 or FIG. 3. According to an embodiment, the first glass 610 may be called a first dielectric material.

According to an embodiment, the second glass 620 may form at least a part of a rear surface (e.g., the rear surface 110B in FIG. 2) of the electronic device 600. The second glass 620 may correspond to, for example, a rear plate 111 illustrated in FIG. 2 or FIG. 3. According to an embodiment, the second glass 620 may be called a second dielectric material.

According to an embodiment, the side member 630 may surround at least a part of a space between the first glass 610 and the second glass 620, and form at least a part of a side surface (e.g., the side surface 110C in FIG. 1). The side member 630 may correspond to, for example, a side bezel structure 118 illustrated in FIG. 1, FIG. 2, or FIG. 3.

According to an embodiment, the display 640 may be positioned in a housing (e.g., the housing 110 in FIG. 1) including the first glass 610, the second glass 620, and the side member 630. The display 640 may be at least partially disposed along the first glass 610, and may be visually exposed through the first glass 610. The display 640 may correspond to, for example, a display 101 illustrated in FIG. 1 or FIG. 3.

According to an embodiment, the first glass 610 may include a part (e.g., the first area 110D in FIG. 1) curvedly extending toward the second glass 620 around the side member 630. The display 640 may be a flexible display disposed along the first glass 610.

According to an embodiment, the antenna module 650 (e.g., the third antenna module 546 in FIG. 5B) may be positioned in a housing (e.g., the housing 110 in FIG. 1)) including the first glass 610, the second glass 620, and the side member 630. The antenna module 650 may include a printed circuit board 653 (e.g., the printed circuit board 501 in FIG. 5B). The printed circuit board 653 may include a first surface 6531 (e.g., the first surface 5011 in FIG. 5B) disposed to face the side member 630, and a second surface (not illustrated) (e.g., the second surface 5012 in FIG. 5C) facing opposite to the first surface 6531. For example, the first surface 6531 (or the second surface) of the printed circuit board 653 may be substantially orthogonal to the front surface 110A in FIG. 1 or the rear surface 110B in FIG. 2. According to an embodiment, the antenna module 650 may be positioned in the electronic device 600 such that the first surface 6531 (or the second surface) of the printed circuit board 653 has an acute angle with respect to the front surface 110A in FIG. 1 or the rear surface 110B in FIG. 2. The antenna module 650 may include an antenna array 651 (e.g., the antenna array 502 in FIG. 5B) positioned on the first surface 6531 or positioned inside the printed circuit board 653 to be adjacent to the first surface 6531. The antenna array 651 may include, for example, a structure in which multiple antenna elements having substantially the same shape are arranged, or a structure in which multiple antenna elements 651a, 651b, 651c, and 651d (e.g., the multiple antenna elements 502a, 502b, 502c, and 502d in FIG. 5B) are to be arranged at predetermined intervals.

According to an embodiment, the multiple antenna elements 651a, 651b, 651c, and 651d may have substantially the same shape, and may be arranged at predetermined intervals. The printed circuit board 653 may include multiple conductive layers (e.g., multiple conductive pattern layers) and multiple non-conductive layers (e.g., insulative layers) alternately stacked with the multiple conductive layers. The multiple antenna elements 651a, 651b, 651c, and 651d may be implemented, for example, by at least some of the multiple conductive layers. According to various embodiments, the shapes, the number, or the positions of the antenna elements included in the antenna array 651 may not be limited to the example illustrated in FIG. 6, and may vary.

According to an embodiment, the multiple antenna elements 651a, 651b, 651c, and 651d may include a patch antenna. According to various embodiments (not illustrated), the multiple antenna elements 651a, 651b, 651c, and 651d may be implemented by dipole antennas or loop antennas.

According to an embodiment, the electronic device 600 may perform beamforming through the antenna array 651. The electronic device 600 may store codebook information relating to beamforming in a memory (e.g., the memory 430 in FIG. 4). The electronic device 600 may efficiently control (e.g., allocate or arrange) multiple beams through the multiple antenna elements 651a, 651b, 651c, and 651d of the antenna array 651, based on the codebook information. The electronic device 600 may adjust a phase of the multiple antenna elements 651a, 651b, 651c, and 651d of the antenna array 651, based on the codebook information. For example, the electronic device 600 may adjust the phase of the current supplied to the multiple antenna elements 651a, 651b, 651c, and 651d of the antenna array 651, so as to form a beam pattern (e.g., beam width, beam direction). According to an embodiment, the multiple antenna elements 651a, 651b, 651c, and 651d of the antenna array 651 may form a beam, the energy of which is relatively largely radiated in a direction toward which the first surface 6531 of the printed circuit board 653 faces. According to an embodiment, the antenna module 650 may form a beam pattern toward the side member 630.

According to an embodiment, the side member 630 may entirely be made of a third dielectric material 631. The side member 630 made of the third dielectric material 631 may reduce the effect on the radio waves emitted from the antenna array 651 so as to reduce the transformation (or distortion) of a beam pattern, or enable coverage (communication range) to be ensured.

According to various embodiments (not illustrated), the side member 630 may include a conductive part and a non-conductive part coupled to the conductive part. The non-conductive part may be disposed to face the first surface 6531 of the antenna module 650, and may substantially overlap with the antenna array 651 when viewed toward the first surface 6531. A structure in which the non-conductive part is disposed to face the first surface 6531 of the antenna module 650 may reduce the effect of the conductive part of the side member 630 on the radio waves emitted from the antenna array 651 so as to reduce the transformation (or distortion) of a beam pattern, or enable coverage (communication range) to be ensured. According to an embodiment, the non-conductive part may include the third dielectric material 631.

According to an embodiment, the antenna module 650 may include a ground layer 652. The ground layer 652 may be disposed on the second surface (e.g., the second surface 5012 in FIG. 5B) of the printed circuit board 653. The ground layer 652 may be electrically connected to the printed circuit board 653.

According to various embodiments, the ground layer 652 may be included in the printed circuit board 653. For example, a ground layer (or a ground plane) implemented by at least some of the multiple conductive layers included in the printed circuit board 653 may be included. The ground layer may be disposed between the second surface (e.g., the second surface 5012 in FIG. 5B) and the antenna array 651, and may at least partially overlap with the antenna array 651 when viewed toward the first surface 6531. The ground layer may be electrically connected to a wireless communication circuit through an electrical path formed by a conductive pattern and/or a conductive via included in the printed circuit board 653. The wireless communication circuit may correspond to, for example, an RFIC (e.g., the RFIC 503 in FIG. 5C) positioned on the second surface on the printed circuit board 653. The ground layer may be related to a radiation characteristic of the antenna array 651. For example, the radiation characteristic of the antenna array 651 may be determined based on the distance from the ground layer to the multiple antenna elements 651a, 651b, 651c, and 651d. For example, the radiation characteristic of the antenna array 651 may be determined based on a shape (e.g., width, length, and thickness) of the ground layer. For example, the radiation characteristic of the antenna array 651 may be determined based on an insulative material (e.g., permittivity) between the multiple antenna elements 651a, 651b, 651c, and 651d and the ground layer. The ground layer may shield or reduce electromagnetic noise affecting the flow of a signal or power on the printed circuit board 653. The terms, such as, "first surface", "second surface", "front surface", "rear surface", or "side surface", used in describing the antenna module 650 according to an embodiment have a relative concept, and if the direction reference of any one is changed, the remaining directions may be changed together.

Figure 7A:
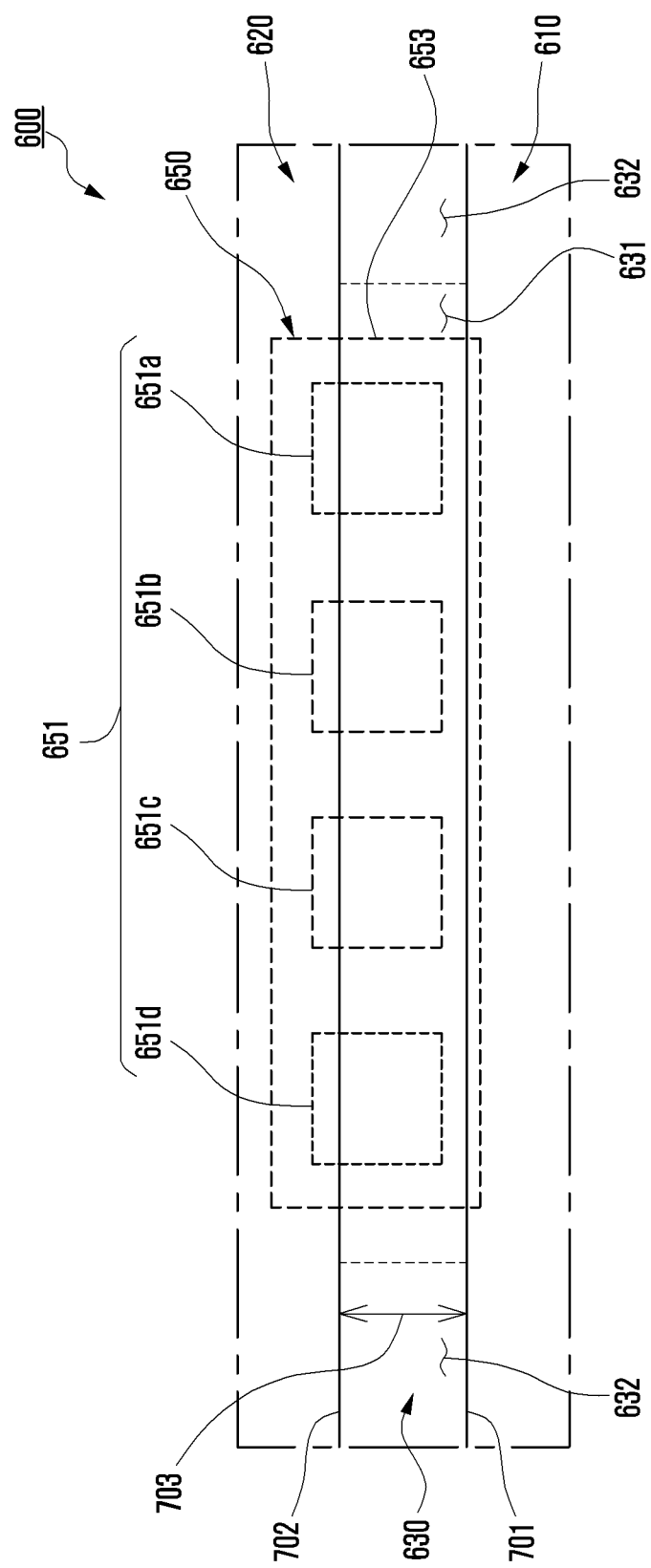
FIG. 7A is a lateral view of the electronic device in FIG. 6, viewed toward a side surface thereof according to an embodiment.
Figure 7B:
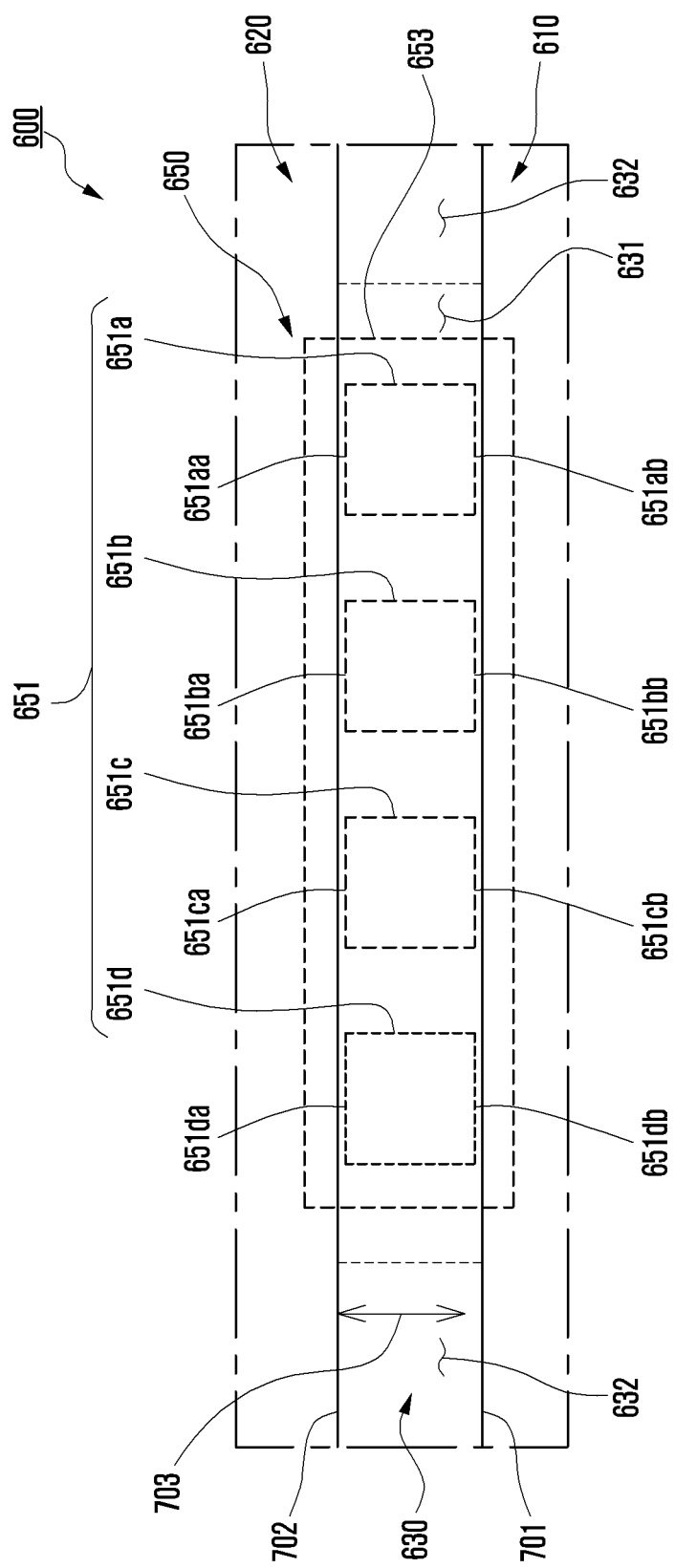
FIG. 7B is a lateral view of the electronic device in FIG. 6, viewed toward a side surface thereof according to another embodiment.

FIG. 7A is a lateral view of the electronic device 600 in FIG. 6, viewed toward a side surface thereof according to an embodiment. FIG. 7B is a lateral view of the electronic device 600 in FIG. 6, viewed toward a side surface thereof according to another embodiment.

Referring to FIG. 7A or FIG. 7B, in an embodiment, the electronic device 600 may include a first glass (or a first dielectric material) 610, a second glass (or a second dielectric material) 620, a side member 630, or an antenna module 650. The printed circuit board 653 of the antenna module 650 may be disposed such that the first surface 6531 is oriented toward the side member 630. The antenna module 650 may include an antenna array 651 positioned on the first surface 6531, or positioned inside the printed circuit board 653 to be adjacent to the first surface 6531. The side member 630 may include a third dielectric material 631, and the third dielectric material 631 may be disposed to face the antenna module 650.

According to an embodiment, when viewed toward the first surface 6531 of the antenna module 650, the third dielectric material 631 may at least partially overlap with the antenna array 651 of the antenna module 650. The side member 630 may include a conductive part 632 coupled to the third dielectric material 631. The third dielectric material 631 and the conductive part 632 may form a side surface (e.g., the side surface 110C in FIG. 1) of the electronic device 600. When viewed toward the first surface 6531 of the antenna module 650, a structure in which the third dielectric material 631 is disposed to at least partially overlap with the antenna array 651 may reduce the effect of the conductive part 632 of the side member 630 on the radio waves emitted from the antenna array 651 so as to reduce the transformation (or distortion) of a beam pattern, or enable coverage (communication range) to be ensured.

According to an embodiment, there may be a first boundary 701 between the first glass 610 and the side member 630, and a second boundary 720 between the second glass 620 and the side member 630. The first boundary 701 may include a boundary line or a boundary plane at which the first glass 610 and the side member 630 are connected to each other. The second boundary 702 may include a boundary line or a boundary plane at which the second glass 620 and the side member 630 are connected to each other. When viewed toward the first surface 6531 of the antenna module 650, the side member 630 may have a height 703 extending from the first boundary 701 to the second boundary 702.

Referring to FIG. 7A, in an embodiment, when viewed toward the first surface 6531 of the antenna module 650, the antenna array 651 may partially overlap with the side member 630. For example, the antenna module 650 may be positioned in the electronic device 600 such that the first boundary 701 does not overlap with the antenna array 651, and the second boundary 702 overlaps with the antenna, when viewed toward the first surface 6531 of the antenna module 650. When viewed toward the first surface 6531 of the antenna module 650, the antenna array 651 may partially overlap with the second glass 620.

Referring to FIG. 7B, in an embodiment, when viewed toward the first surface 6531 of the antenna module 650, the antenna array 651 may be disposed between the first boundary 701 and the second boundary 702. According to an embodiment, the antenna module 650 may be positioned in the electronic device 600 such that the first boundary 701 and the second boundary 702 do not overlap with the antenna array 651 when viewed toward the first surface 6531 of the antenna module 650.

According to various embodiments (not illustrated), the first boundary 701 may be implemented to substantially overlap with edges 651aa, 651ba, 651ca, and 651da of one side of the antenna array 651 when viewed toward the first surface 6531 of the antenna module 650. According to various embodiments (not illustrated), the second boundary 702 may be implemented to substantially overlap with edges 651ab, 651bb, 651cb, and 651db of an opposite side of the antenna array 651 when viewed toward the first surface 6531 of the antenna module 650.

Figure 7C:
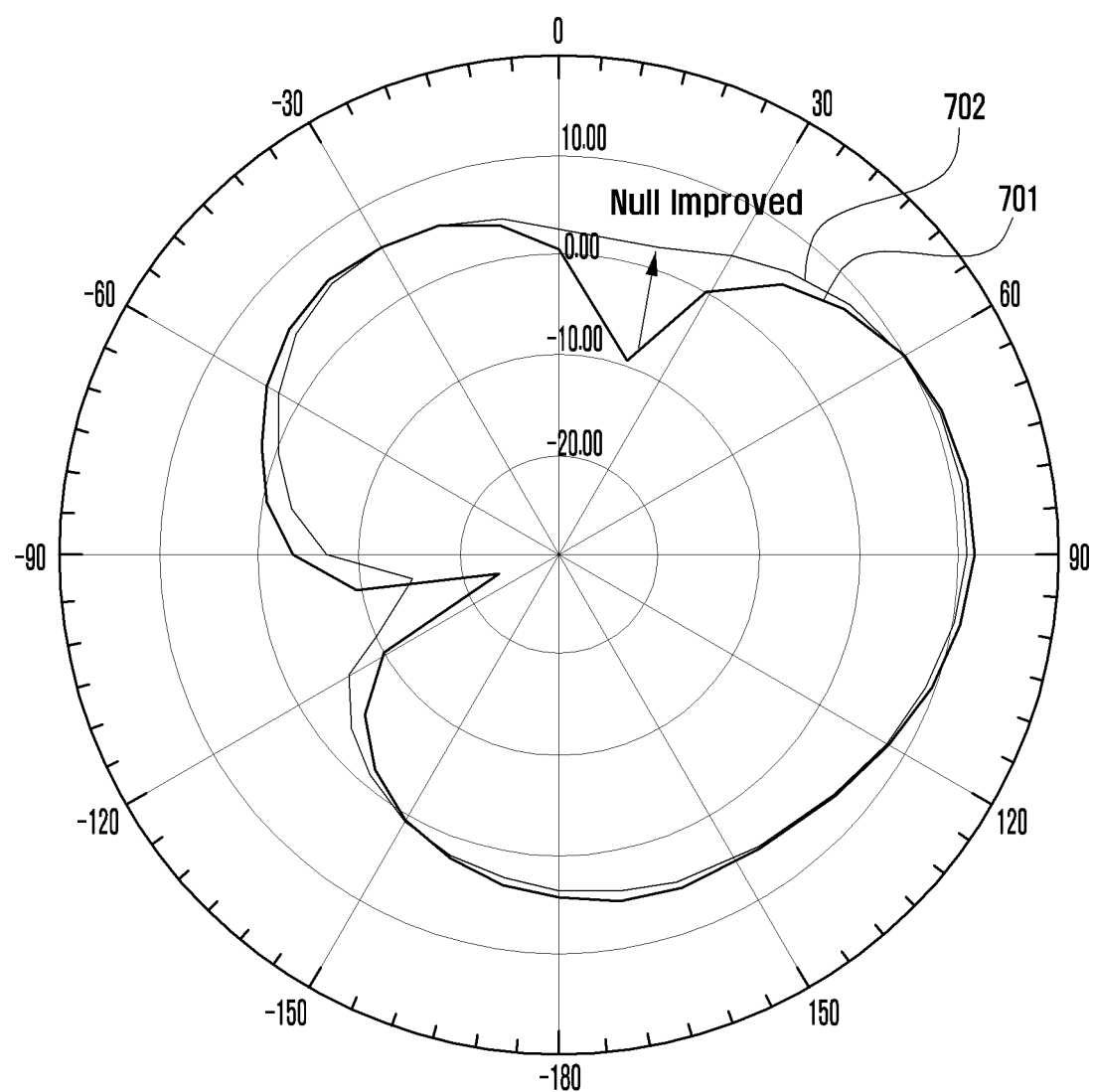
FIG. 7C illustrates a radiation pattern for the embodiment of FIG. 7A and the embodiment of FIG. 7B according to an embodiment.

FIG. 7C illustrates a radiation pattern for the embodiment of FIG. 7A and the embodiment of FIG. 7B according to an embodiment.

Referring to FIG. 7A, FIG. 7B, and FIG. 7C, 90° may indicate a first direction toward the side member 630, for example, the direction toward which the first surface 6531 of the antenna module 650 faces. −90° may indicate a second direction opposite to the first direction. 0° may indicate a third direction orthogonal to the first direction, for example, the direction toward the second glass 620 of the electronic device 600. −180° may indicate a fourth direction opposite to the third direction, for example, the direction toward the first glass 610.

In an embodiment, reference numeral 701 may indicate a radiation pattern of the antenna module 650 of the electronic device 600 according to the embodiment of FIG. 7A. Reference numeral 702 may indicate a radiation pattern of the antenna module 650 of the electronic device 600 according to the embodiment of FIG. 7B. In comparison between the radiation pattern indicated by reference numeral 701 and the radiation pattern indicated by reference numeral 702, in a case where the entirety of the antenna array 651 overlaps with the third dielectric material 631 of the side member 630 when viewed toward the first surface 6531 of the antenna module 650 as in the embodiment of 7B, null can be reduced. If a boundary point between different materials exists in a path in which a radio wave (or a signal) is radiated, a difference in speed of a communication signal may be incurred by different permittivities of the materials, and the phase of the radio wave may be discontinuous. Accordingly, after a radio wave has passed the boundary point, the radio wave has different radiation directions, resulting in the distortion of a radiation pattern, and null may indicate this phenomenon. The null described above may indicate an invalid area in which it is difficult for the antenna array 651 to radiate or detect radio waves. The null may indicate a direction in which radiation strength is substantially 0. As described in the embodiment of FIG. 7B, in a case where the first glass 610 and the second glass 620 do not overlap the antenna array 651 when viewed toward the first surface 6531 of the antenna module 650, there is no change in permittivity in a radiation path of a communication signal. Therefore, a null phenomenon can be reduced compared to the embodiment of FIG. 7A.

Figure 8A:
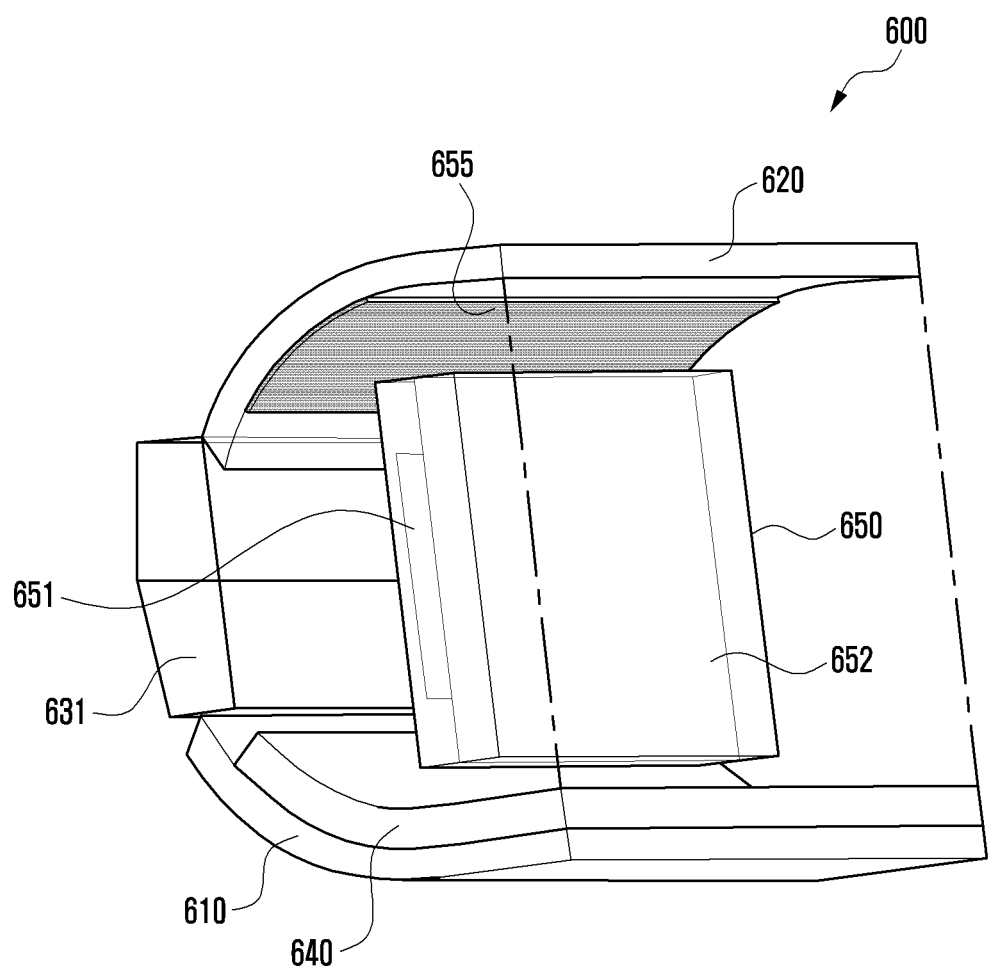
FIG. 8A illustrates an electronic device further including a conductive coating layer according to various embodiments.
Figure 8B:
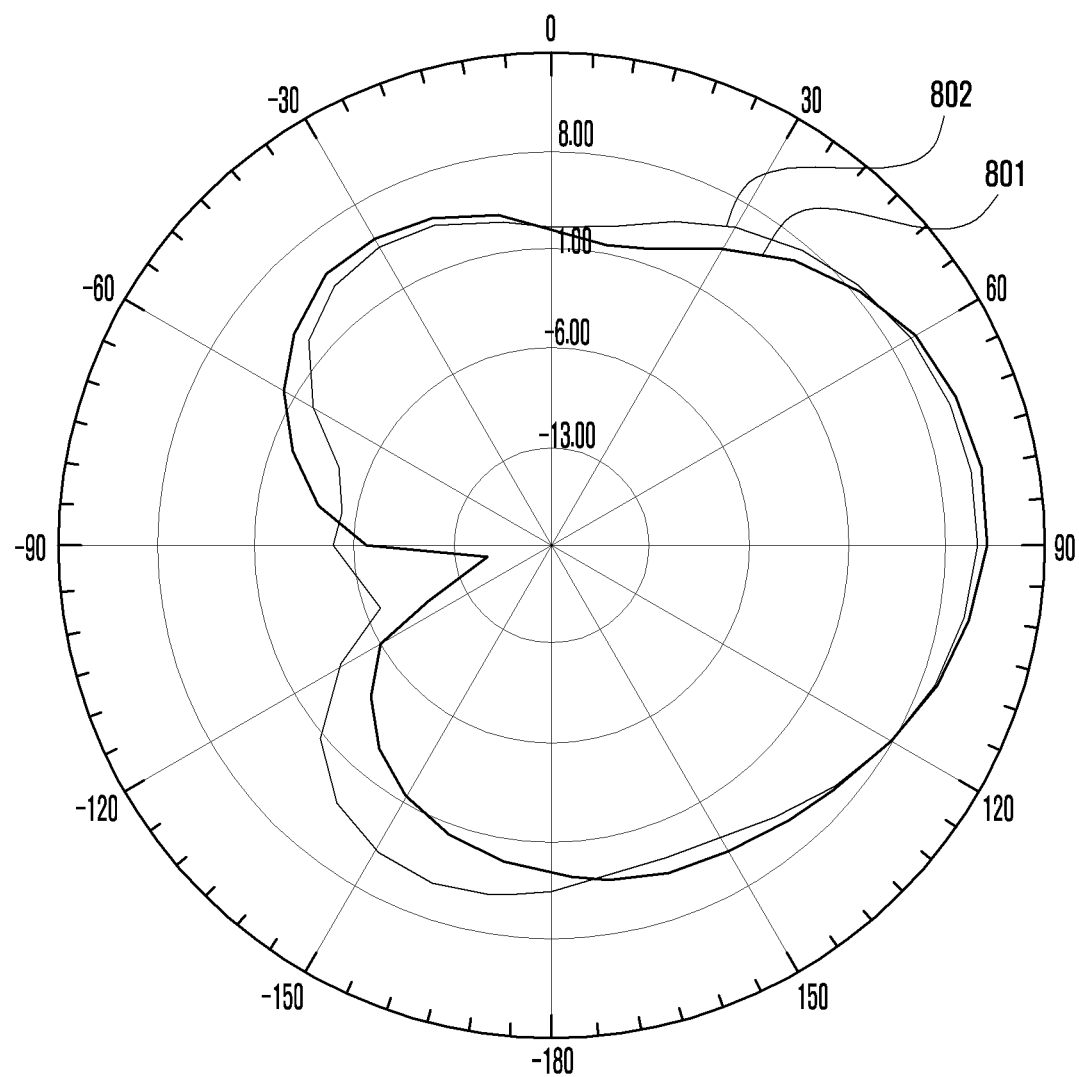
FIG. 8B illustrates a radiation pattern of an antenna module according to the embodiment of FIG. 8A.

FIG. 8A illustrates an electronic device 600 further including a conductive coating layer 655 according to various embodiments. FIG. 8B illustrates a radiation pattern of an antenna module 650 according to the embodiment of FIG. 8A.

Referring to FIG. 8A, the electronic device 600 may include a conductive coating layer 655 positioned on an inside surface of the second glass 620 to implement electrical symmetry around the antenna array 651. The display 640 (e.g., the display 101 in FIG. 3) may include a conductive material or a conductive support member (SUS) as a component included therein, and the conductive coating layer 655 may be disposed at the second glass 620 to be symmetric to the conductive material or the conductive support member. Therefore, radiation patterns which are vertically symmetrical and uniform based on the state illustrated in FIG. 8A can be implemented.

FIG. 8B illustrates a radiation pattern of a case where the coating layer 655 is not disposed, and a radiation pattern of a case where the coating layer 655 is disposed according to an embodiment.

Referring to FIG. 8B, reference numeral 801 indicates a radiation pattern of a case where the conductive coating layer 655 is not disposed. Reference numeral 802 indicates a radiation pattern of a case where the conductive coating layer 655 is disposed. In comparison between the radiation pattern indicated by reference numeral 801 and the radiation pattern indicated by reference numeral 802, null around 30° may be reduced. In comparison between the radiation pattern indicated by reference numeral 801 and the radiation pattern indicated by reference numeral 802, radiation performance at or around 150° may be reduced. In comparison between the radiation pattern indicated by reference numeral 801 and the radiation pattern indicated by reference numeral 802, radiation performance at or around 90° may be degraded. Such degradation of radiation performance may be caused by energy required to be radiated in the direction toward a side surface (e.g., the side surface 110C in FIG. 1), but being radiated in the opposite direction.

Figure 9A:
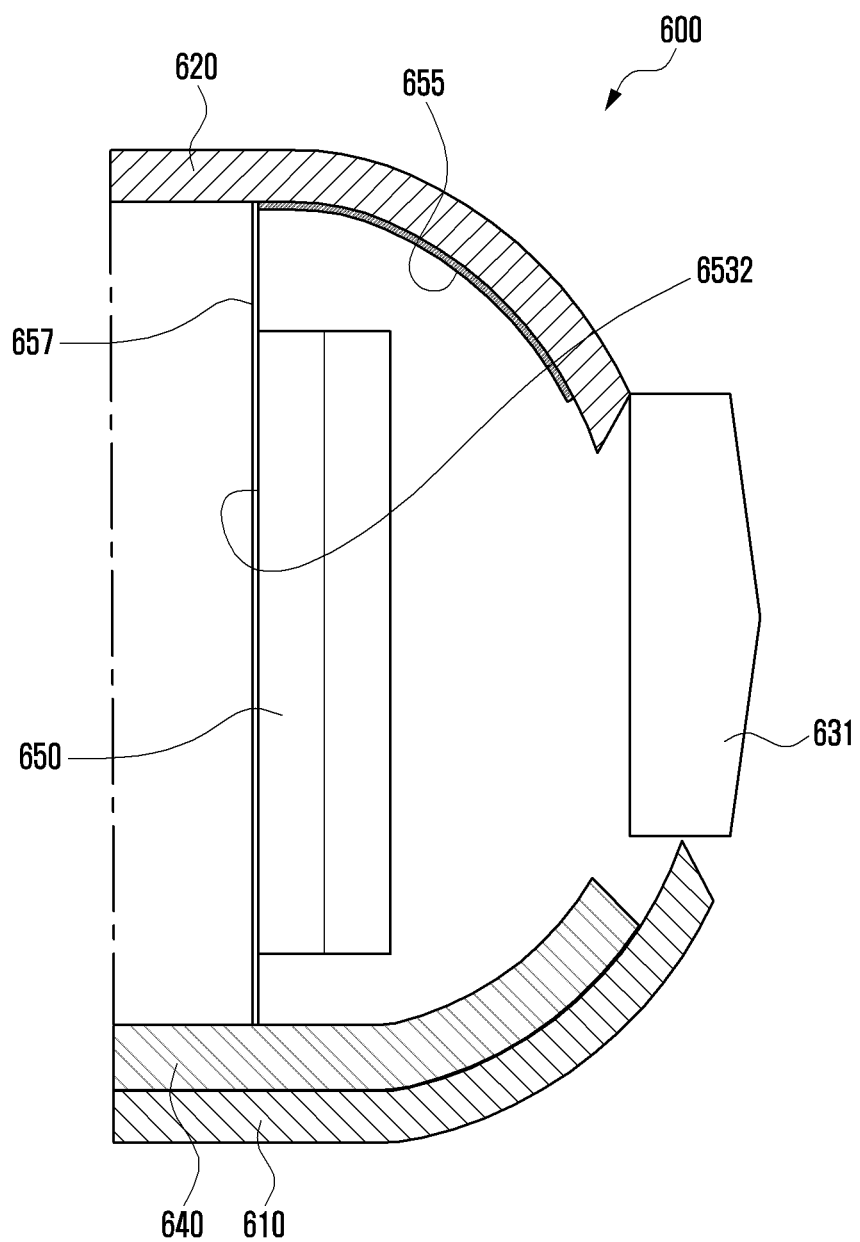
FIG. 9A is a cross sectional view of an electronic device further including a reflection plate according to various embodiments.
Figure 9B:
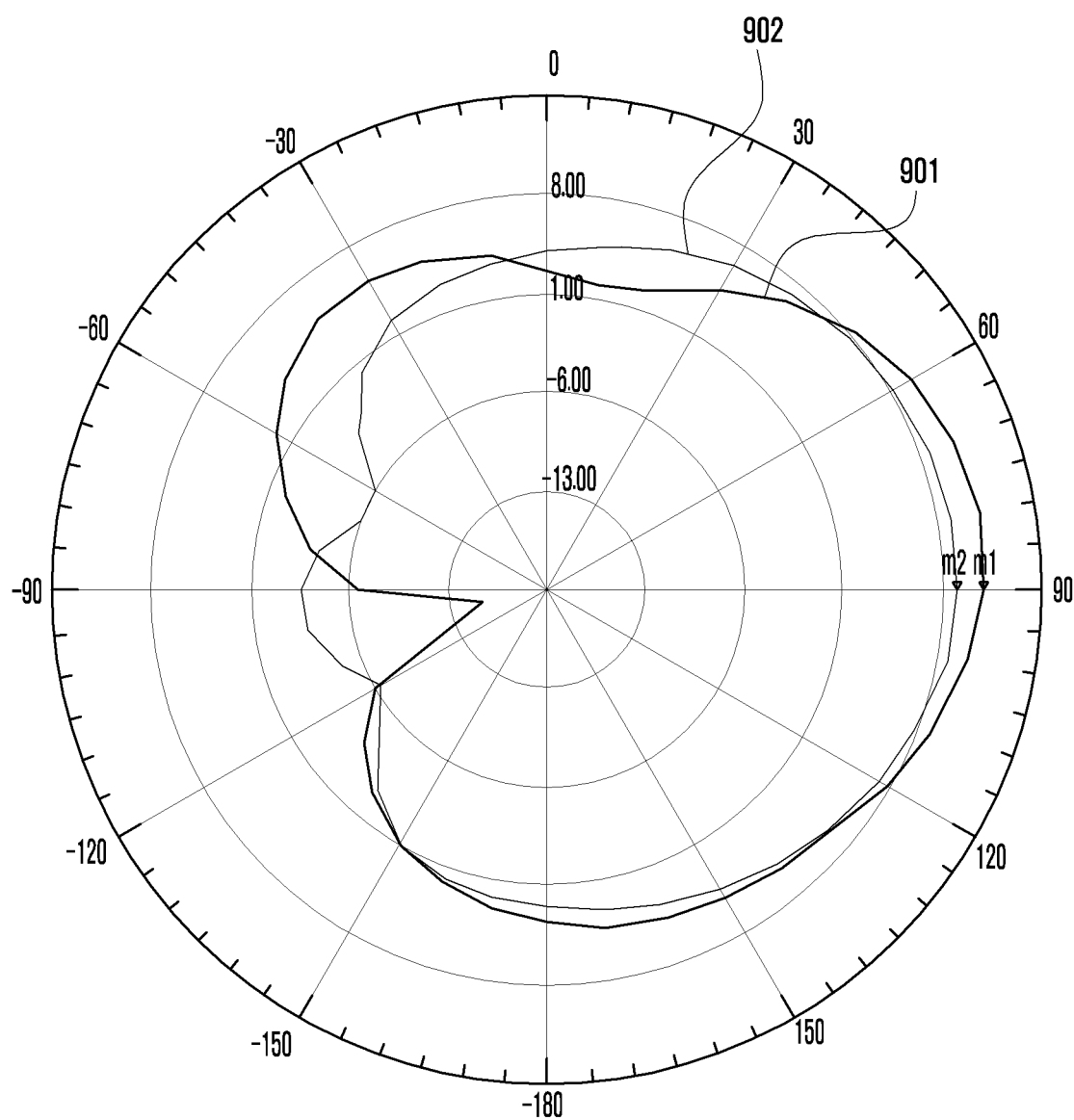
FIG. 9B illustrates a radiation pattern of an antenna module according to the embodiment of FIG. 9A.

FIG. 9A is a cross sectional view of an electronic device 600 further including a reflection plate 657 according to various embodiments. FIG. 9B illustrates a radiation pattern of an antenna module 650 according to the embodiment of FIG. 9A.

Referring to FIG. 9A, in an embodiment, the antenna module 650 may be disposed between the reflection plate 657 and the third dielectric material 631. According to an embodiment, a second surface 6532 (e.g., the second surface 5012 in FIG. 5C) of the antenna module 650 may face the reflection plate 657. The antenna module 650 may be positioned on the reflection plate 657. The reflection plate 657 may be implemented by various conductive materials.

Referring to FIG. 9B, reference numeral 901 indicates a radiation pattern of a case where the reflection plate 657 is not disposed and the conductive coating layer 655 is disposed. Reference numeral 902 indicates a radiation pattern of a case where the reflection plate 657 and the conductive coating layer 655 are arranged. In comparison between the radiation pattern indicated by reference numeral 901 and the radiation pattern indicated by reference numeral 902, in a case where the reflection plate 657 is added, a uniform radiation pattern is shown, but radiation performance at or around 90° may be reduced. This may be because a signal fails to be radiated and is stored (e.g., coupled) between the antenna module 650 and the reflection plate 657 according to the embodiment of FIG. 9A. That is, a signal required to be radiated in the direction toward the third dielectric material 631 is not reflected by the reflection plate 657 and is coupled to the reflection plate 657, so that radiation performance at or around 90° may be reduced.

Figure 10A:
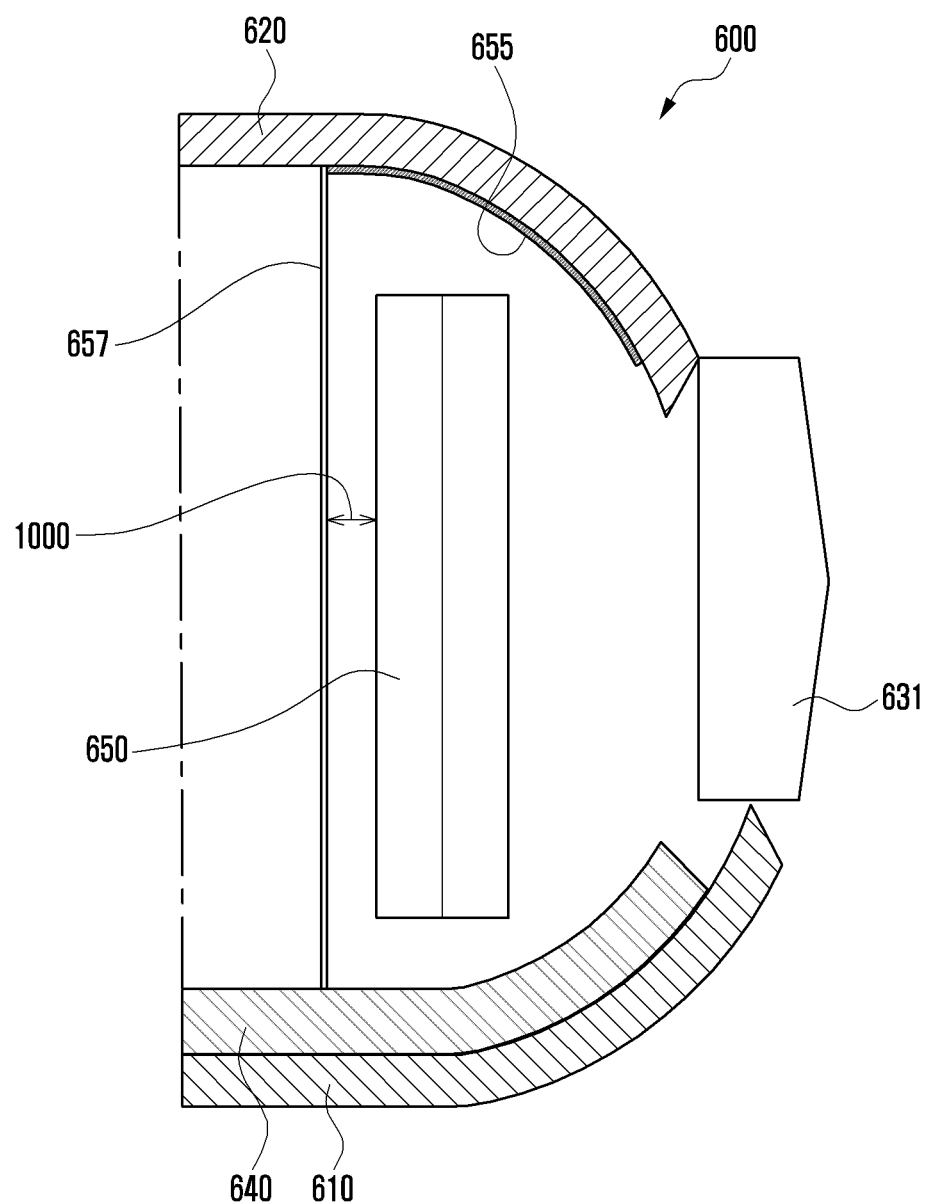
FIG. 10A is a cross sectional view of an electronic device in which the interval between an antenna module and a reflection plate is changed according to various embodiment.
Figure 10B:
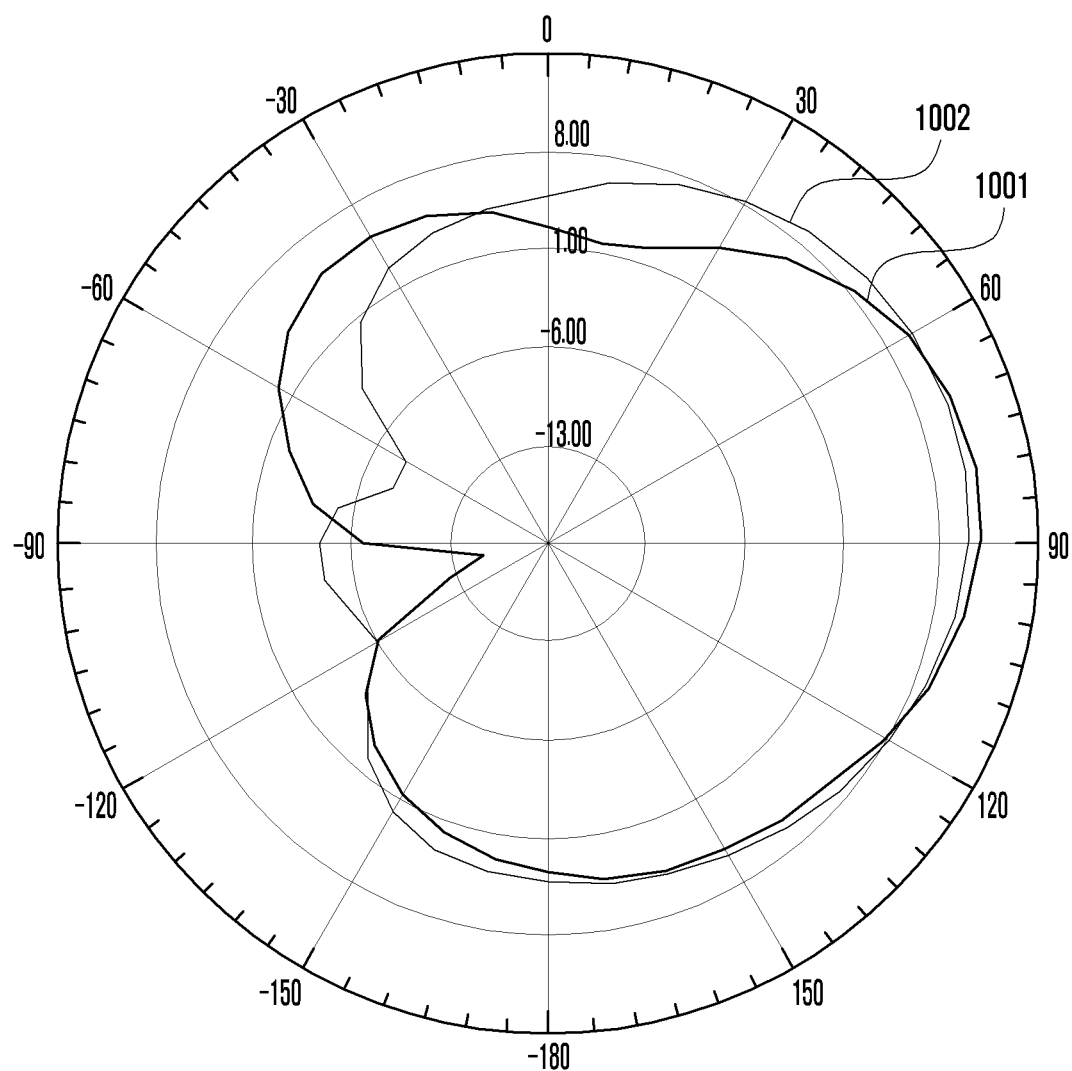
FIG. 10B illustrates a radiation pattern of an antenna module according to the embodiment of FIG. 10A.

FIG. 10A is a cross sectional view of an electronic device 600 in which the interval 1000 between an antenna module 650 and a reflection plate 657 is changed according to various embodiment. FIG. 10B illustrates a radiation pattern of an antenna module 650 according to the embodiment of FIG. 10A.

Referring to FIG. 10A, according to an embodiment, the antenna module 650 and the reflection plate 657 may be arranged to be separate from each other. For example, the reflection plate 657 may be spaced a designated distance 1000 apart from the antenna module 650 in the direction toward which the second surface 6532 (e.g., the second surface 5012 in FIG. 5C) of the antenna module 650 faces. According to an embodiment, the designated distance may be a distance corresponding to the wavelength of a radiation signal of the antenna module 650. For example, the designated distance may correspond to approximately 0.1λ with respect to the wavelength of a signal emitted from the antenna module 650.

Referring to FIG. 10B, reference numeral 1001 indicates a radiation pattern of a case where only the conductive coating layer 655 is disposed as in the embodiment of FIG. 8A. Reference numeral 1002 indicates a radiation pattern of a case where the conductive coating layer 655 and the reflection plate 657 are positioned at the designated interval 1000 apart from each other as in the embodiment of FIG. 10A. In comparison between the radiation pattern indicated by reference numeral 1001 and the radiation pattern indicated by reference numeral 1002, when the designated interval 1000 exists between the conductive coating layer 655 and the reflection plate 657, degradation of radiation performance of the antenna module 650 may be reduced. When the designated interval 1000 exists between the conductive coating layer 655 and the reflection plate 657, a desired (or ideal) radiation pattern of linear beams may be generated. This may be because the reflection plate 657 does not store a signal emitted in the direction toward which the second surface 6532 of the antenna module 650 faces, and reflects the signal in the direction toward which the first surface 6531 of the antenna module 650 faces. The conductive materials included in the conductive coating layer 655 and the display 640 (e.g., the display 303) may induce energy to flow in the direction toward which the first surface 651 of the antenna module 650 faces, and thus the energy may be substantially radiated toward the third dielectric material 631 of the side member.

Figure 11A:
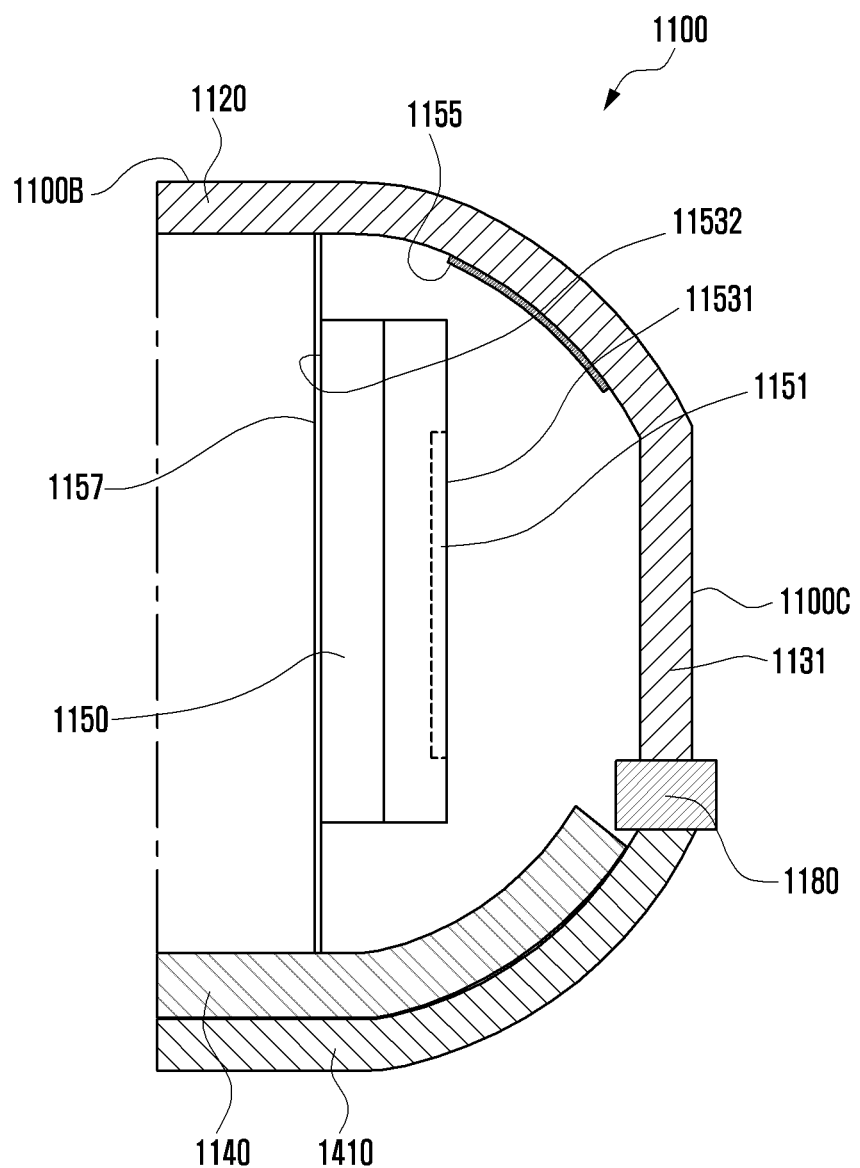
FIG. 11A is a cross sectional view of an electronic device which emits radio waves (or energy) through a side surface of the electronic device according to another embodiment.
Figure 11B:
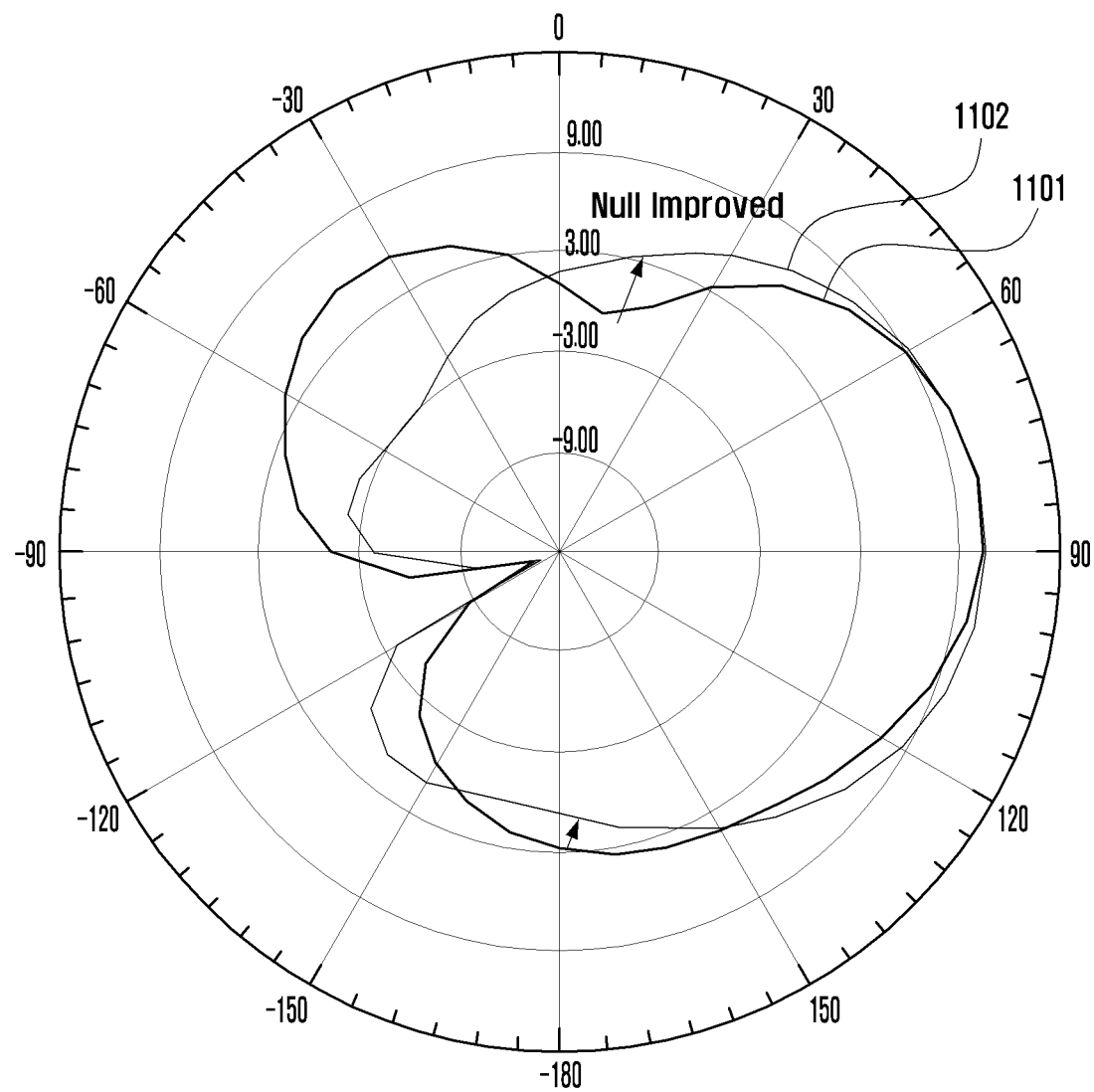
FIG. 11B illustrates a radiation pattern of an antenna module according to the embodiment of FIG. 11A.

FIG. 11A is a cross sectional view of an electronic device 1100 which emits radio waves (or energy) through a side surface 1100C of the electronic device 1100 according to another embodiment. FIG. 11B illustrates a radiation pattern of an antenna module 1150 according to the embodiment of FIG. 11A.

Referring to FIG. 11A, in an embodiment, the electronic device 1100 may include a first glass 1110, a second glass 1120, an antenna module 1150, a conductive coating layer 1155, a reflection plate 1157, or a conductive bezel 1180. The first glass 1110 may include, for example, the first glass 610 illustrated in FIG. 9A. The antenna module 1150 may include, for example, the antenna module 650 illustrated in FIG. 9A. The conductive coating layer 1155 may include, for example, the conductive coating layer 655 illustrated in FIG. 9A. The reflection plate 1157 may include, for example, the reflection plate 657 illustrated in FIG. 9A.

According to an embodiment, in comparison with the electronic device 600 in FIG. 6, the second glass 1120 may extend from a rear surface 1100B (e.g., the rear surface 110B in FIG. 2) of the electronic device 1100 to a side surface 1100C (e.g., the side surface 110C in FIG. 2) instead of the side member 630. According to an embodiment, a part of the second glass 1120, which faces the antenna module 1150 and forms the side surface 1100C, may be called a third dielectric material 1131.

According to an embodiment, the conductive bezel 1180 may be at least partially positioned between the first glass 1110 and the second glass 1120 (or the third dielectric material 1131). According to various embodiments, the conductive bezel 1180 may form an outer appearance of the electronic device 1100 together with the first glass 1110 and the second glass 1120. According to an embodiment, the conductive bezel 1180 may be included in the side bezel structure 118 illustrated in FIG. 3. Referring to FIG. 11B, reference numeral 1102 indicates a radiation pattern of the embodiment of FIG. 11A. The radiation pattern indicated by reference numeral 1102 may not have a substantially large null phenomenon compared to the null part of FIG. 7C. This may be because the second glass 1120 is extended to the side surface 1100C, and thus a contact point between materials having different permittivities does not substantially exist in the direction toward which an antenna array 1151 (e.g., the antenna array 651 in FIG. 6) faces (e.g., the direction toward the side surface 1100C). However, in the radiation pattern indicated by reference numeral 1102, it is noted that there may be some loss related to radiation proceeding in the direction toward which a second surface 11532 of the antenna module 1150 faces. Reference numeral 1101 indicates a radiation pattern of a case where the reflection plate 1157 is disposed to be spaced an interval of about 0.1λ apart from the antenna module 1150 in order to reduce loss of radiation proceeding in the direction toward which the second surface 11532 (e.g., the second surface 6532 of FIG. 6) of the antenna module 1150 faces, in comparison with the embodiment of FIG. 11A. In the radiation pattern indicated by reference numeral 1101, it may be noted that a null phenomenon and loss of radiation proceeding in the direction toward which the second surface 11532 (e.g., the second surface 6532 of FIG. 6) of the antenna module 1150 faces are reduced in comparison with the radiation pattern indicated by reference numeral 1102. In the radiation pattern indicated by reference numeral 1101, it may be noted that radiation performance of radiation (see 180° part) proceeding in the direction toward the first glass 1110 degrades in comparison with the radiation pattern indicated by reference numeral 1102. This may occur according to a change in permittivity around the antenna module 1150, caused by the extension of the second glass 1120 to the side surface 1100C.

Figure 12A:
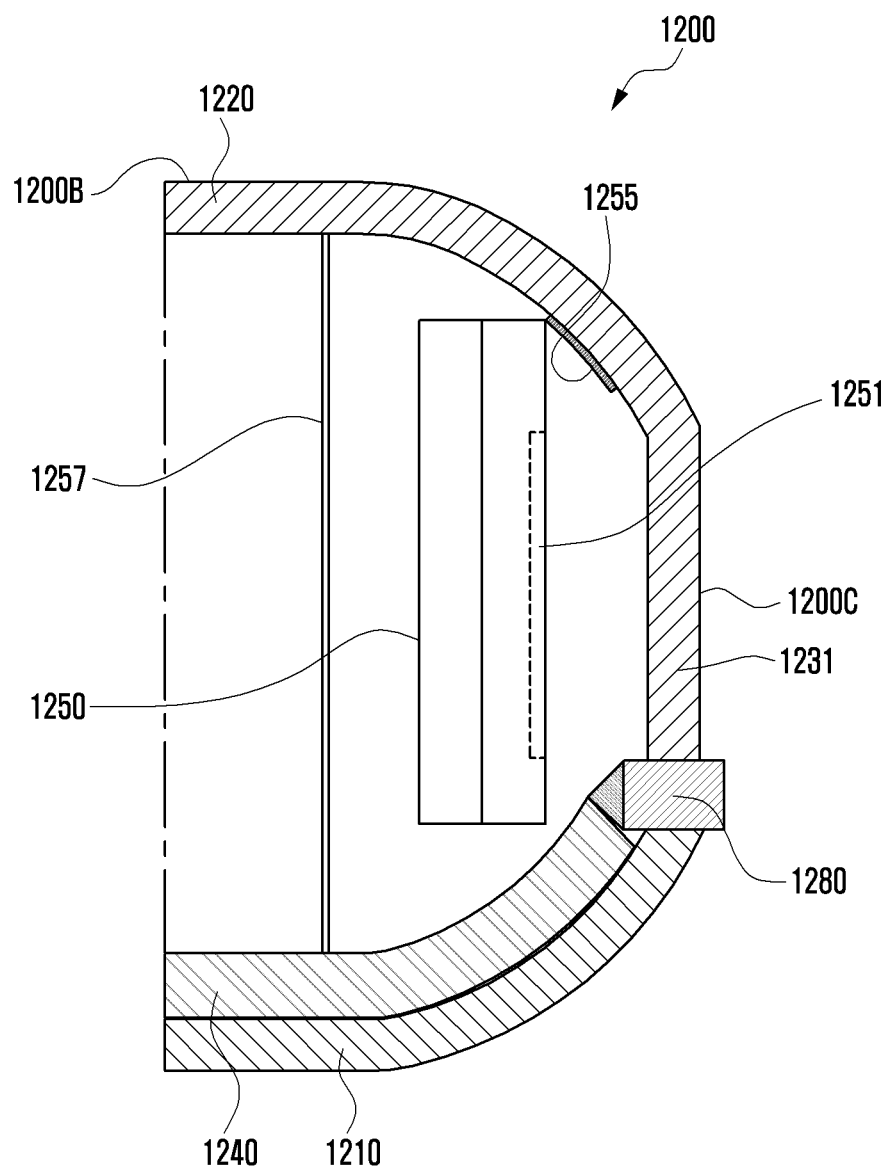
FIG. 12A is a cross sectional view of an electronic device which emits radio waves (or energy) through a side surface of the electronic device according to another embodiment.
Figure 12B:
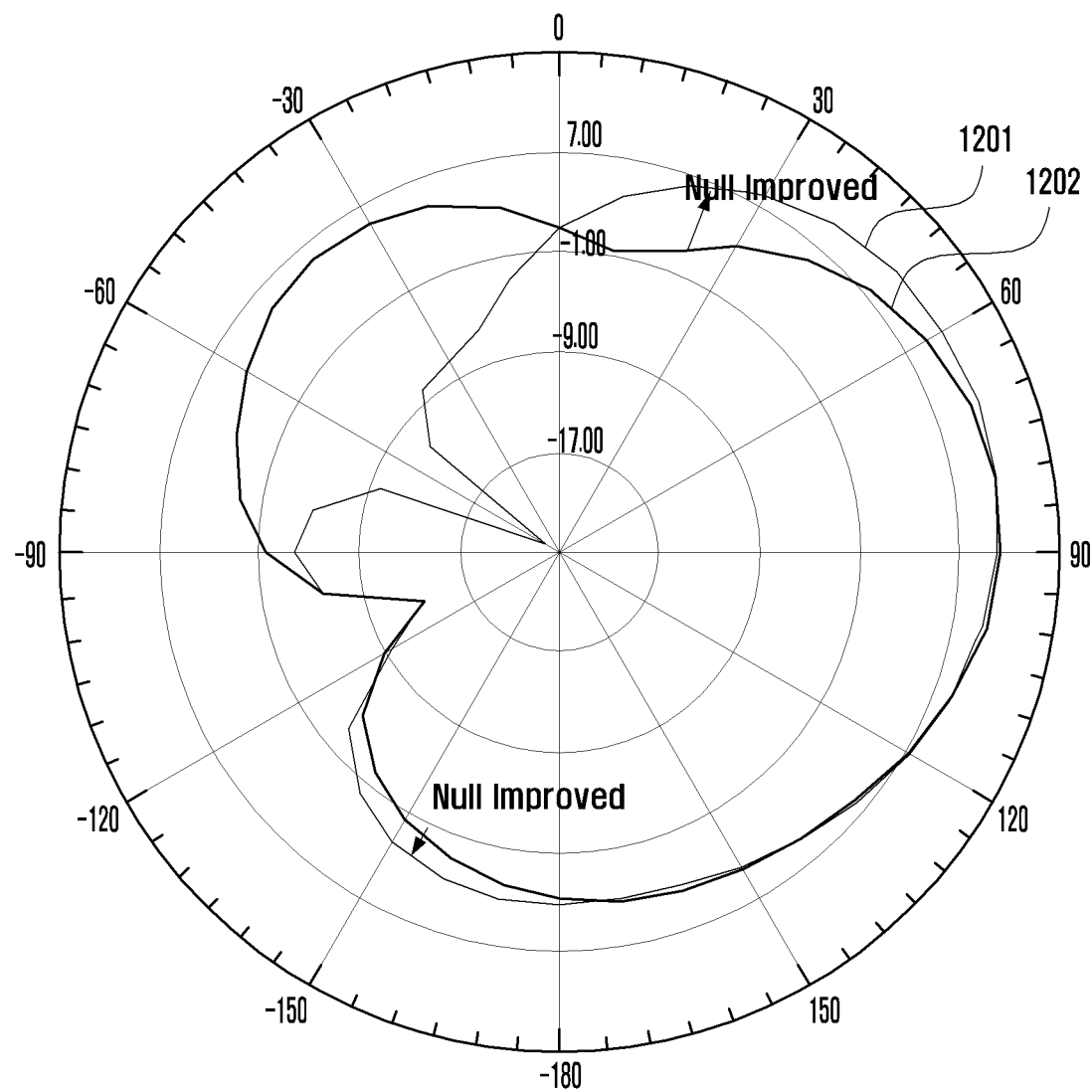
FIG. 12B illustrates a radiation pattern of an antenna module according to the embodiment of FIG. 12A.

FIG. 12A is a cross sectional view of an electronic device 1200 which emits radio waves (or energy) through a side surface 1200C of the electronic device 1200 according to another embodiment. FIG. 12B illustrates a radiation pattern of an antenna module 1250 according to the embodiment of FIG. 12A.

Referring to FIG. 12A, in an embodiment, the electronic device 1200 may include a first glass 1210, a second glass 1220, an antenna module 1250, a conductive coating layer 1255, a reflection plate 1257, or a conductive bezel 1280. The first glass 1210 may include, for example, the first glass 610 illustrated in FIG. 9A or the first glass 1110 illustrated in FIG. 11A. The antenna module 1250 may include, for example, the antenna module 650 illustrated in FIG. 9A or the antenna module 1150 illustrated in FIG. 11A. The conductive coating layer 1255 may include, for example, the conductive coating layer 655 illustrated in FIG. 9A or the conductive layer 1155 illustrated in FIG. 11A. The reflection plate 1157 may include, for example, the reflection plate 657 illustrated in FIG. 9A or the reflection plate 1157 illustrated in FIG. 11A. In an embodiment, in comparison with the electronic device 600 in FIG. 6, the second glass 1220 may extend from a rear surface 1200B (e.g., the rear surface 110B in FIG. 2 or the rear surface 1100B in FIG. 11A) of the electronic device 1200 to at least a part of a side surface 1200C (e.g., the side surface 110C in FIG. 2 or the rear surface 1100C in FIG. 11A) instead of the side member 630. According to an embodiment, a part of the second glass 1220, which faces the antenna module 1250 and forms the side surface 1200C, may be called a third dielectric material 1231.

According to an embodiment, the conductive bezel 1280 may be at least partially positioned between the first glass 1210 and the second glass 1220 (or the third dielectric material 1231). According to various embodiments, the conductive bezel 1280 may form an outer appearance of the electronic device 1200 together with the first glass 1210 and the second glass 1220. The conductive bezel 1280 (e.g., the conductive bezel structure 1180 in FIG. 11A) may be included, for example, in the side bezel structure 118 illustrated in FIG. 3.

According to the embodiment of FIG. 12A, the conductive coating layer 1255 may be positioned on the second glass 1220 in order to adjust the position of the reflection plate 1257 and induce a radiation pattern in −180° direction.

Referring to FIG. 12B, reference numeral 1201 indicates a radiation pattern of a case where the conductive coating layer 1255 and the reflection plate 1257 are spaced a predetermined interval apart from the antenna module 1250. Reference numeral 1202 indicates a radiation pattern of a case where the conductive coating layer 1255 and the reflection plate 1257 are omitted. In comparison between the radiation pattern indicated by reference numeral 1201 and the radiation pattern indicated by reference numeral 1202, radiation performance of the direction toward the first glass 1210 may be improved, and a null phenomenon may be reduced in the embodiment of FIG. 12A. In comparison between the radiation pattern indicated by reference numeral 1201 and the radiation pattern indicated by reference numeral 1202, energy radiated in an undesired (or unnecessary) direction may be reduced in the embodiment of FIG. 12A.

The conductive coating layer 1255 according to an embodiment may be positioned on a part of the second glass 1220 such that the layer does not vertically overlap with the antenna module 1250, based on the state illustrated in FIG. 12A. According to the embodiment of FIG. 12A, an antenna array 1251 (e.g., the antenna array 651 of FIG. 6) may not overlap with the conductive bezel 1280 when viewed toward a first surface (e.g., the first surface 5011 in FIG. 5B) of the antenna module 1250. According to various embodiments, the conductive bezel 1280 may not overlap with the antenna module 1250 when viewed toward the first surface (e.g., the first surface 5011 in FIG. 5B) of the antenna module 1250. If the conductive coating layer 1255 is positioned at the second glass 1220 as in the embodiment of FIG. 8A, undesired (or unnecessary) coupling between the antenna module 1250 and the conductive coating layer 1255 is incurred, and thus radiation performance may degrade. Therefore, the conductive coating layer 1255 may be positioned at a part of the second glass 1220 as in the embodiment of FIG. 12A.

Figure 13:
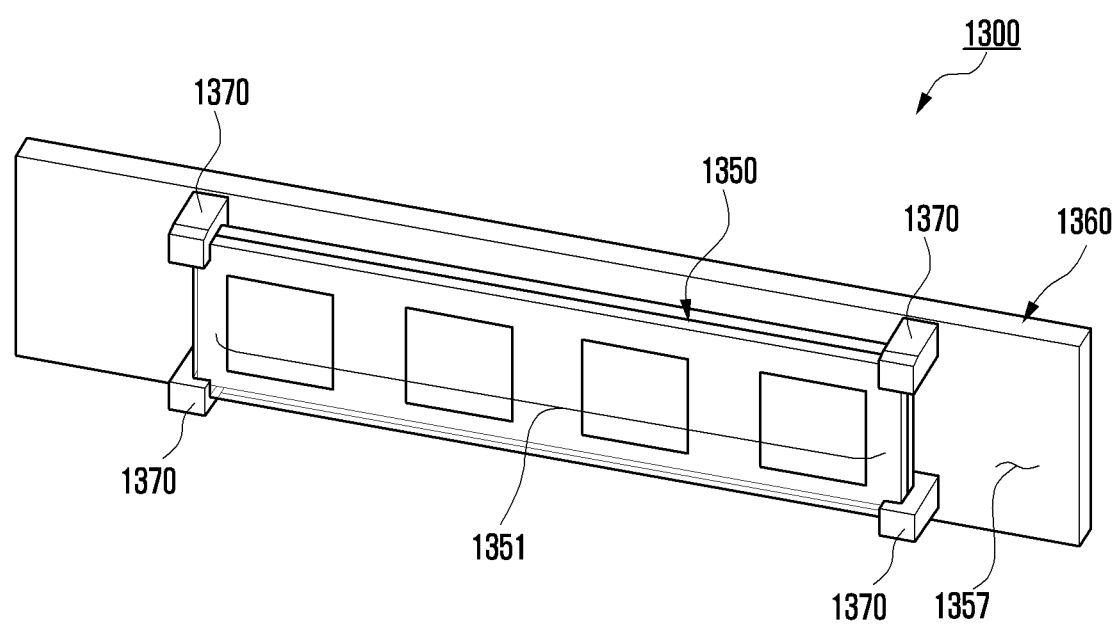
FIG. 13 illustrates an assembly of an antenna module according to various embodiments.

FIG. 13 illustrates an assembly 1300 of an antenna module 1350 according to various embodiments.

Referring to FIG. 13, in an embodiment, the assembly 1300 may include an antenna module 1350, and a bracket 1360 at which the antenna module 1350 is disposed.

According to an embodiment, the antenna module 1350 (e.g., the third antenna module 546 in FIG. 5B) may be fixed to various support members, such as the bracket 1360. According to an embodiment, the bracket 1360 may include fixing protrusions 1370 arranged to dispose the antenna module 1350. The fixing protrusions 1370 may protrude from the bracket 1360 and may include a non-conductive material. When the antenna module 1350 is coupled to the fixing protrusions 1370, the antenna module 1350 may be positioned at a distance from the bracket 1360.

According to various embodiments, the bracket 1360 may be included in the first support member 311 illustrated in FIG. 3. According to an embodiment, the bracket 1360 may correspond to another support member disposed at the first support member 311. The bracket 13604, at which the antenna module 1350 is disposed, may be positioned in the electronic device such that an antenna array 1351 (e.g., the antenna array 502 in FIG. 5B) faces a side surface (e.g., the side surface 110C in FIG. 1) of the electronic device (e.g., the electronic device 100 in FIG. 1).

According to an embodiment, one surface of the bracket 1360, which faces the antenna module 1350, may be implemented by a reflection part 1357. The reflection part 1357 may secure radiation performance of the direction toward which a first surface 13531 (e.g., the first surface 5011 in FIG. 5B) of the antenna module 1350 faces (e.g., the direction toward the side surface in FIG. 1 (e.g., the side surface 110C in FIG. 1)).

According to various embodiments, the reflection part 1357 may be a separate plate. According to various embodiments, the reflection part 1357 may be formed by coating, with a corresponding material, one surface of the bracket 1360, which faces the antenna module 1350.

Figure 14A:
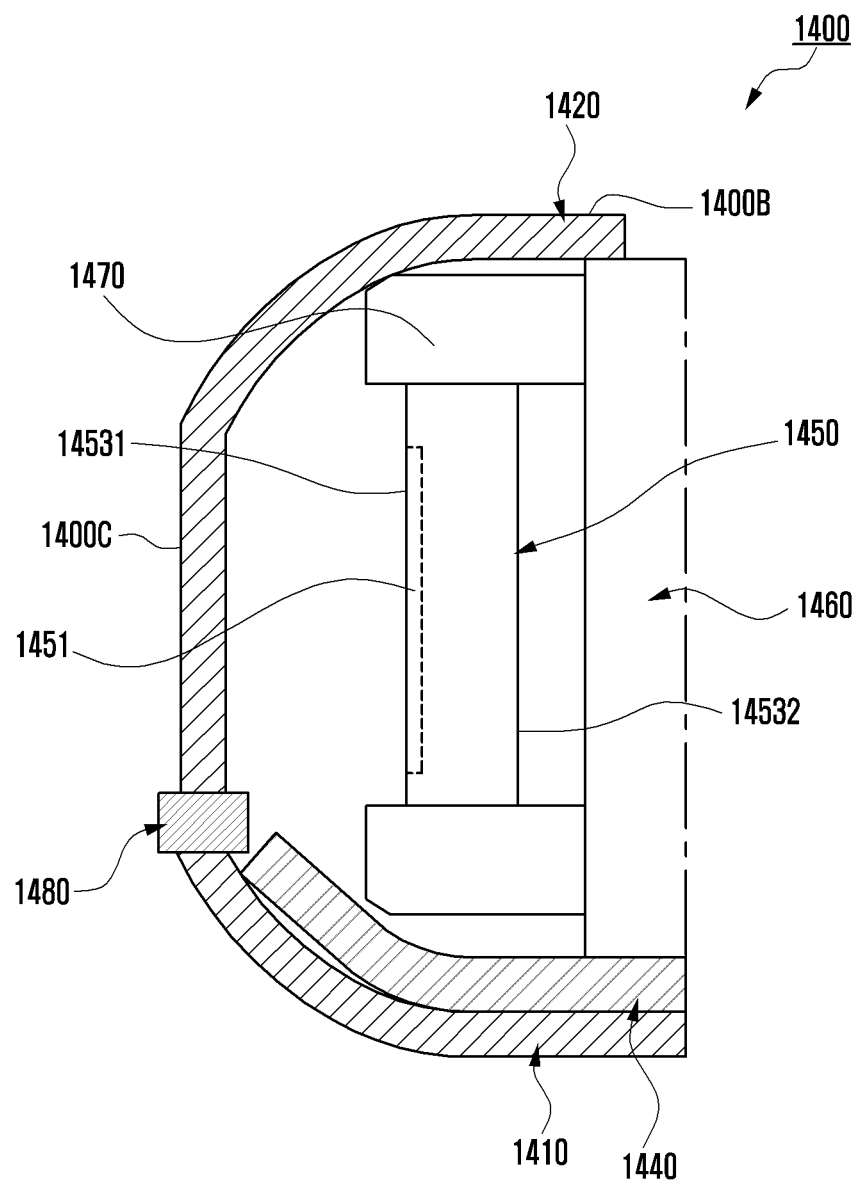
FIG. 14A is a cross sectional view of an electronic device including an antenna module according to another embodiment.
Figure 14B:
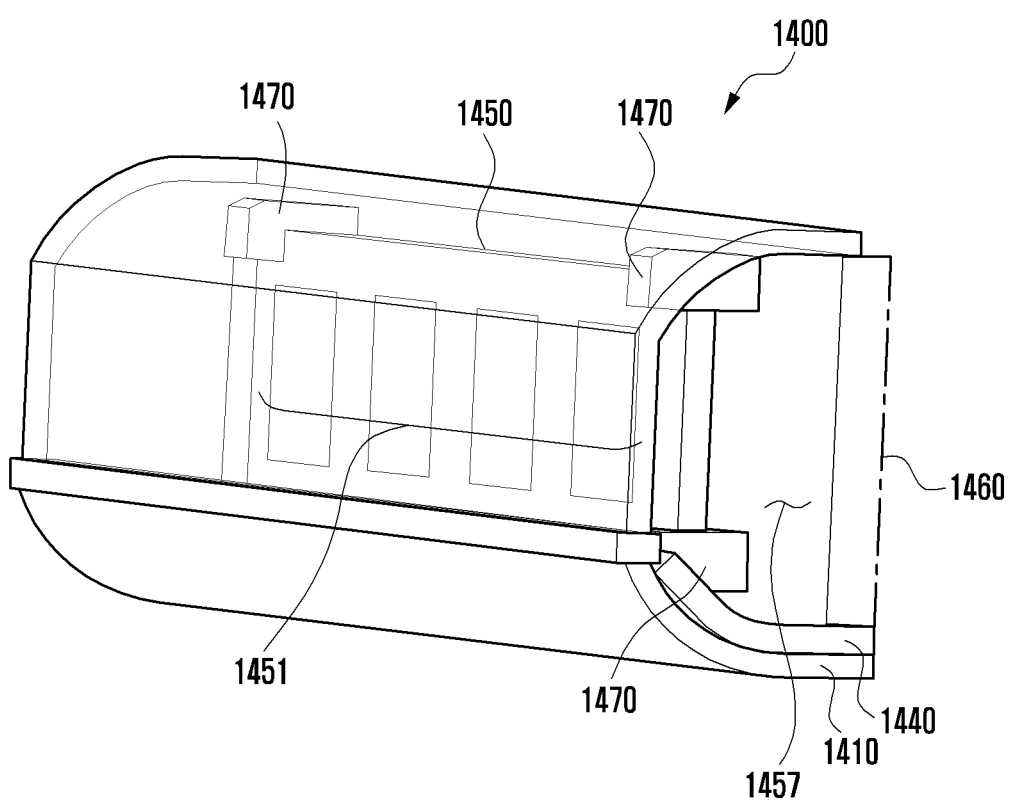
FIG. 14B is a perspective view of an electronic device according to the embodiment of FIG. 14A.

FIG. 14A is a cross sectional view of an electronic device 1400 including an antenna module 1450 according to another embodiment. FIG. 14B is a perspective view of an electronic device 1400 according to the embodiment of FIG. 14A.

Referring to FIG. 14A and FIG. 14B, the electronic device 1400 may include a first glass 1410, a second glass 1420, an antenna module 1450, a bracket 1460, or a conductive bezel 1480. The first glass 1410 may include, for example, the first glass 610 illustrated in FIG. 9A or the first glass 1110 illustrated in FIG. 11A. The antenna module 1450 may include, for example, the antenna module 650 illustrated in FIG. 9A or the antenna module 1150 illustrated in FIG. 11A. In an embodiment, in comparison with the electronic device 600 in FIG. 6, the second glass 1420 may extend from a rear surface 1400B (e.g., the rear surface 110B in FIG. 2 or the rear surface 1100B in FIG. 11A) of the electronic device 1400 to at least a part of a side surface 1400C (e.g., the side surface 110C in FIG. 2 or the rear surface 1100C in FIG. 11A) instead of the side member 630. According to an embodiment, a part of the second glass 1420, which faces the antenna module 1450 and forms the side surface 1400C, may be called a third dielectric material 1431.

According to an embodiment, the conductive bezel 1480 may be at least partially positioned between the first glass 1410 and the second glass 1420 (or the third dielectric material 1431). According to various embodiments, the conductive bezel 1480 may form an outer appearance of the electronic device 1400 together with the first glass 1410 and the second glass 1420. The conductive bezel 1480 (e.g., the conductive bezel 1180 in FIG. 11A) may be included, for example, in the side bezel structure 118 illustrated in FIG. 3.

According to an embodiment, the antenna module 1450 may be positioned in the electronic device 1400 such that a first surface 14531 (e.g., the first surface 6531 in FIG. 6) of the antenna module 1450 faces the side surface 1400C. For example, the antenna module 1450 may be disposed at the bracket 1460 (e.g., the bracket 1360 in FIG. 13) positioned in the electronic device 1400 through fixing protrusions 1470 (e.g., the fixing protrusions 1370 in FIG. 13), and accordingly, an antenna array 1451 (e.g., the antenna array 651 in FIG. 6) of the antenna module 1450 may face the side surface 1400C. A second surface 14532 (e.g., the second surface 5012 in FIG. 5C) of the antenna module 1450 may be spaced apart from the bracket 1460. According to various embodiments, the disclosure is not limited to the embodiment of FIG. 14A, and the antenna module 1450 may be disposed at various angles preventing a change in permittivity in a radiation path of a communication signal of the antenna module 1450. It may be helpful to make a periphery (e.g., a space between the side surface 1400C and the first surface 14531) of the antenna module 1450 empty within the emptiable range so as to improve antenna radiation performance.

According to various embodiments, the antenna module 1450 may be positioned in the electronic device 1400 according to various other schemes replacing the bracket 1460. For example, the antenna module 1450 may be disposed to face the side surface 1400C while electrically connected to a printed circuit board (e.g., the printed circuit board 340 in FIG. 3) through various electrical paths, such as a board-to-board connector or an interposer. For example, the antenna module 1450 may be disposed to face the side surface 1400C while electrically connected to the printed circuit board (e.g., the printed circuit board 340 in FIG. 3) by being inserted into a connector, such as a socket, electrically connected to the printed circuit board. The antenna module 1450 may be positioned in the electronic device 1400 to face the side surface 1400C through various other schemes.

According to an embodiment, one surface of the bracket 1460, which faces the antenna module 1450, may be implemented by a reflection part 1457 (e.g., the reflection part 1357 in FIG. 13). The reflection part 1457 may secure radiation performance of the direction toward which a first surface 14531 (e.g., the first surface 5011 in FIG. 5B) of the antenna module 1450 faces (e.g., the direction toward the side surface 1400C).

Figure 14C:
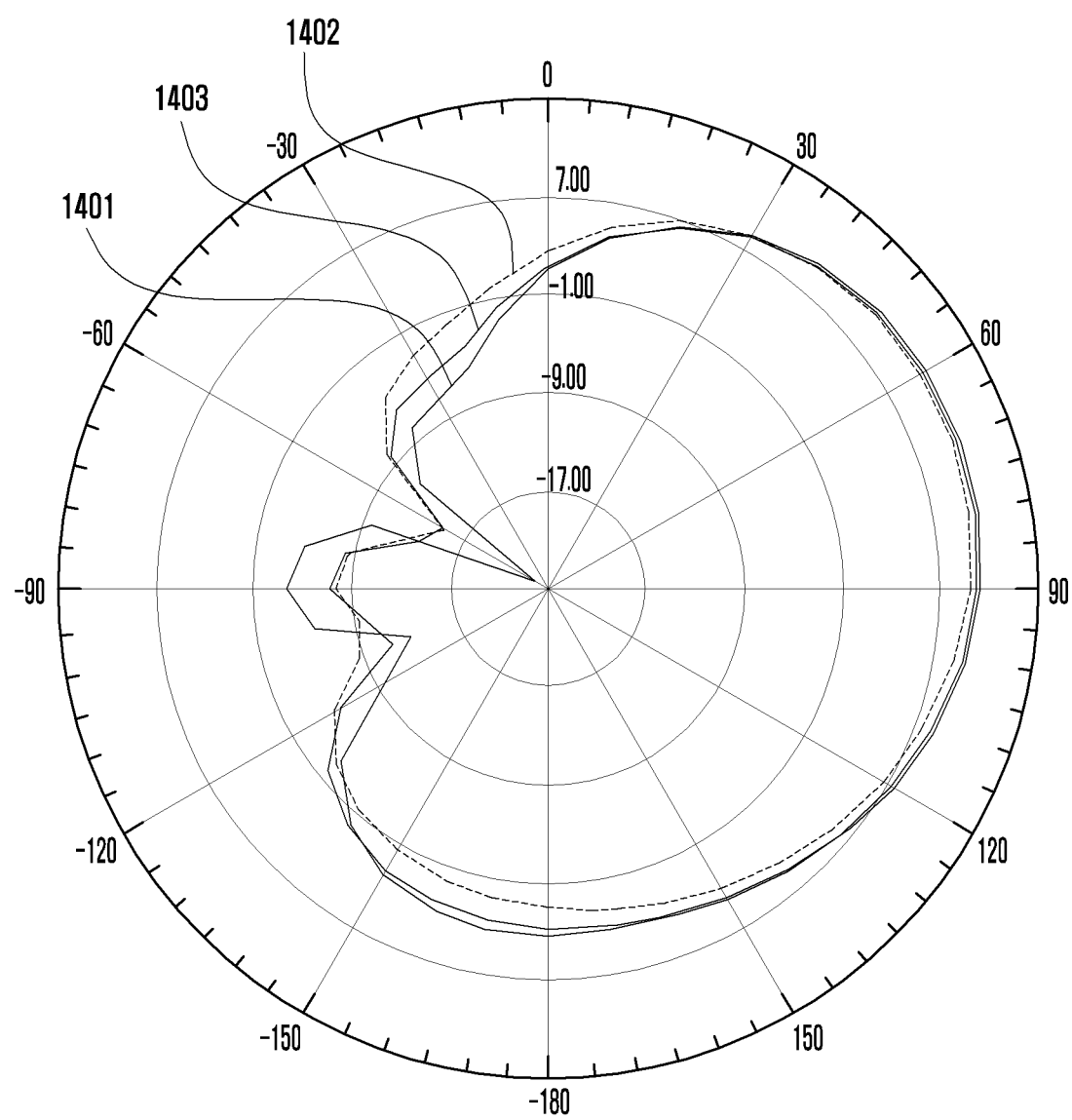
FIG. 14C illustrates a radiation performance according to a structure for fixing an antenna module according to various embodiments.

FIG. 14C illustrates a radiation performance according to a structure for fixing an antenna module 1450 according to various embodiments.

Referring to FIG. 14C, reference numeral 1401 indicates a radiation pattern of a first case in which only a reflection plate (e.g., the reflection plate 1157 in FIG. 11A) is positioned in the electronic device 1400 with respect to the antenna module 1450 without other structures. Reference numeral 1402 indicates a radiation pattern of a second case where a corresponding structure (not illustrated) is disposed to surround at least a part of a side surface of the antenna module 1450 (e.g., a side surface surrounding a space between the first surface 14531 and the second surface 14532 of FIG. 14A). Reference numeral 1403 indicates a radiation pattern of a third case where the antenna module 1450 is disposed at the bracket 1360 such that the fixing protrusions 1470 occupy only a minimum area of the antenna module 1450 as in the embodiments in FIG. 14A and FIG. 14B. In comparison among the radiation patterns indicated by reference numerals 1401, 1402, and 1403, radiation performance of the first case may be the best. In comparison among the radiation patterns indicated by reference numerals 1401, 1402, and 1403, radiation performance at 180° (e.g., the direction toward the first glass 1410) may degrade in the second case. In comparison among the radiation patterns indicated by reference numerals 1401, 1402, and 1403, the third case may have a smaller difference in radiation performance from the first case than that from the second case.

According to an embodiment of the disclosure, an electronic device (e.g., the electronic device 600 in FIG. 6) may include: a first dielectric material (e.g., the first dielectric material 610 in FIG. 6) forming at least a part of a front surface (e.g., the front surface 110A in FIG. 1) of the electronic device; a second dielectric material (e.g., the second dielectric material 620 in FIG. 6) forming at least a part of a rear surface (e.g., the rear surface 110B in FIG. 2) of the electronic device; and a side member (e.g., the side member 630 in FIG. 6) which surrounds a space between the front surface and the rear surface, and at least a part of which includes a third dielectric material (e.g., the third dielectric material 631 in FIG. 6). The electronic device may include a display (e.g., the display 640 in FIG. 6) positioned in the space and visually exposed through the first dielectric material. The electronic device may include an antenna module (e.g., the antenna module 650 in FIG. 6) positioned in the space. The antenna module may include a printed circuit board (e.g., the printed circuit board 501 in FIG. 5B or the printed circuit board 653 in FIG. 6) including a first surface (e.g., the first surface 5011 in FIG. 5B or the first surface 6531 in FIG. 6) facing the third dielectric material in the space, and a second surface (e.g., the second surface 5012 in FIG. 5C) facing opposite to the first surface. The antenna module may include at least one antenna element (e.g., the antenna array 651 in FIG. 6) which is disposed on the first surface or disposed in the printed circuit board to be adjacent to the first surface, and forms a beam pattern toward the side member.

According to an embodiment of the disclosure, the printed circuit board (e.g., the printed circuit board 653 in FIG. 6) may be positioned such that a space is disposed between the board and the third dielectric material (e.g., the third dielectric material 631 in FIG. 6).

According to an embodiment of the disclosure, the electronic device may further include a conductive coating layer (e.g., the conductive coating layer 655 in FIG. 8A or the conductive coating layer 1255 in FIG. 12A) positioned at the second dielectric material. The conductive coating layer extends from a first position adjacent to the antenna module (e.g., the antenna module 650 in FIG. 8A or the antenna module 1250 in FIG. 12A) to a second position adjacent to the third dielectric material (e.g., the third dielectric material 631 in FIG. 8A or the third dielectric material 1231 in FIG. 12A).

According to an embodiment of the disclosure, the electronic device may further include a reflection plate (e.g., the reflection plate 1157 in FIG. 11A or the reflection plate 1257 in FIG. 12A) which is positioned on the second surface or around the second surface and includes a conductive material.

According to an embodiment of the disclosure, the reflection plate (e.g., the reflection plate 1257 in FIG. 12A) may be positioned to be spaced a designated distance apart from the printed circuit board (e.g., the printed circuit board 501 in FIG. 5B).

According to an embodiment of the disclosure, the designated distance may correspond to 0.1λ with respect to a wavelength of a signal emitted from the antenna module.

According to an embodiment of the disclosure, the electronic device may further include a bracket (e.g., the bracket 1460 in FIG. 14A) which is made of a conductive material and is positioned in the space to be spaced apart from the side member while the printed circuit board (e.g., the printed circuit board 501 in FIG. 5B) is disposed between the bracket and the side member. The bracket may include a reflection part (e.g., the reflection part 1457 in FIG. 14B) disposed on one surface which is opposite to the printed circuit board and is spaced apart from the printed circuit board.

According to an embodiment of the disclosure, the electronic device may further include multiple fixing protrusions (e.g., the multiple fixing protrusions 1470 in FIG. 14B) which extend from the bracket (e.g., the bracket 1460 in FIG. 14B) and are connected to the antenna module (e.g., the antenna module 1450 in FIG. 14B).

According to an embodiment of the disclosure, the at least one antenna element (e.g., the antenna array 651 in FIG. 7B) may be positioned not to overlap with the first dielectric material (e.g., the first glass 610 in FIG. 7A) and/or the second dielectric material (e.g., the second glass 620 in FIG. 7A) when viewed toward the first surface (e.g., the first surface 6531 in FIG. 7A).

According to an embodiment of the disclosure, the at least one antenna element (e.g., the antenna array 651 in FIG. 7B) may be positioned not to overlap with a first boundary (e.g., the first boundary 701 in FIG. 7B) between the first dielectric material (e.g., the first glass 610 in FIG. 7B) and the side member (e.g., the side member 630 in FIG. 7B), and to overlap with a second boundary (e.g., the second boundary 702 in FIG. 7B) between the second dielectric material (e.g., the second glass 620 in FIG. 7B) and the side member, when viewed toward the first surface (e.g., the first surface 6531 in FIG. 7B).

According to an embodiment of the disclosure, the first dielectric material (e.g., the first glass 610 in FIG. 6) may curvedly extend toward the second dielectric material (e.g., the second glass 620 in FIG. 6) around the side member (e.g., the side member 630 in FIG. 6).

According to an embodiment of the disclosure, the first dielectric material (e.g., the first glass 1110 in FIG. 11A) and the third dielectric material (e.g., the third dielectric material 1131 in FIG. 11A) may be integrated and may include an identical material.

According to an embodiment of the disclosure, the at least one antenna element may include an antenna array (e.g., the antenna array 651 in FIG. 6) having multiple antenna elements arranged in a third direction which is perpendicular to a first direction from the first dielectric material to the second dielectric material, and is perpendicular to a second direction toward which the first surface faces.

According to an embodiment of the disclosure, the multiple antenna elements (e.g., the multiple antenna elements 651a, 651b, 651c, and 651d in FIG. 6) may include a patch antenna.

According to an embodiment of the disclosure, the antenna module may further include a communication circuit (e.g., the RFIC 503 in FIG. 5C) positioned on the second surface (e.g., the second surface 5012 in FIG. 5C) and electrically connected to the at least one antenna element. The communication circuit may be configured to transmit and/or receive a signal within at least a part of a frequency band of 3 GHz to 100 GHz through the at least one antenna.

The embodiments of the disclosure described and shown in the specification and the drawings have presented specific examples in order to easily explain the technical contents of embodiments of the disclosure and help understanding of embodiments of the disclosure, and are not intended to limit the scope of embodiments of the disclosure. Therefore, the scope of various embodiments of the disclosure should be construed to include, in addition to the embodiments disclosed herein, all changes and modifications that are derived on the basis of the technical idea of various embodiments of the disclosure.

The invention claimed is:
1. A mobile communication device comprising:
  a front plate forming at least a portion of a front surface of the mobile communication device;
  a rear plate forming at least a portion of a rear surface of the mobile communication device;

a first conductive portion, a second conductive portion, and a non-conductive portion of a side member forming a side surface of the mobile communication device, the non-conductive portion located between the first conductive portion and the second conductive portion;
a printed circuit board (PCB) including a first surface facing the non-conductive portion and a second surface opposite to the first surface;
an antenna array disposed on the first surface of the PCB, facing the non-conductive portion to transmit or receive signals of a millimeter wave frequency band through the non-conductive portion;
a first conductive element located between the front plate and the antenna array;
a second conductive element located between the rear plate and the antenna array; and
a conductive plate located between the front plate and the rear plate, and substantially parallel with the PCB such that the PCB is located between the conductive plate and the side surface and is disposed on the conductive plate,
wherein the second surface of the PCB faces the conductive plate, and
wherein the second conductive element is at least partially separated from the conductive plate.

2. The mobile communication device of claim 1, wherein the antenna array is fully overlapped with the non-conductive portion when viewed in a direction toward the side surface.

3. The mobile communication device of claim 1, wherein the first conductive element prevents signals generated by the antenna array from being transmitted through the front plate, and wherein the second conductive element prevents signals generated by the antenna array from being transmitted through the rear plate.

4. The mobile communication device of claim 1, wherein the second conductive element is substantially symmetric to the first conductive element.

5. The mobile communication device of claim 1, further comprising a communication circuit configured to transmit or receive the signals through the antenna array, and
wherein the communication circuit is disposed on the second surface.

6. The mobile communication device of claim 1, wherein the antenna array includes a plurality of patch antennas.

7. The mobile communication device of claim 1,
wherein the antenna array includes multiple antenna elements arranged in a third direction which is perpendicular to a first direction from the front plate to the rear plate, and is perpendicular to a second direction toward which the first surface faces.

8. The mobile communication device of claim 1, wherein the front plate or the rear plate comprises at least one of glass and polymer.

9. A mobile communication device comprising:
a front plate forming at least a portion of a front surface of the mobile communication device;
a rear plate forming at least a portion of a rear surface of the mobile communication device;
a first conductive portion, a second conductive portion, and a non-conductive portion of a side member forming a side surface of the mobile communication device, the non-conductive portion located between the first conductive portion and the second conductive portion;
a printed circuit board (PCB) including a first surface facing the non-conductive portion and a second surface opposite to the first surface;
an antenna array disposed on the first surface of the PCB, facing the non-conductive portion to transmit or receive signals of a millimeter wave frequency band through the non-conductive portion;
a first conductive element located between the front plate and the antenna array;
a second conductive element located between the rear plate and the antenna array and substantially symmetric to the first conductive element; and
a conductive plate located between the front plate and the rear plate, and substantially parallel with the PCB such that the PCB is located between the conductive plate and the side surface and is disposed on the conductive plate,
wherein the second surface of the PCB faces the conductive plate, and
wherein the second conductive element is at least partially separated from the conductive plate.

10. The mobile communication device of claim 9, wherein the antenna array is fully overlapped with the non-conductive portion when viewed in a direction toward the side surface.

11. The mobile communication device of claim 9, further comprising a communication circuit configured to transmit or receive the signals through the antenna array, and
wherein the communication circuit is disposed on the second surface.

12. The mobile communication device of claim 9, wherein the antenna array includes a plurality of patch antennas.

13. The mobile communication device of claim 9,
wherein the antenna array includes multiple antenna elements arranged in a third direction which is perpendicular to a first direction from the front plate to the rear plate, and is perpendicular to a second direction toward which the first surface faces.

14. The mobile communication device of claim 9, wherein the front plate or the rear plate comprises at least one of glass and polymer.

15. A mobile communication device comprising:
a front plate forming at least a portion of a front surface of the mobile communication device;
a rear plate forming at least a portion of a rear surface of the mobile communication device;
a side member including a first conductive portion, a second conductive portion, and a non-conductive portion disposed between the first conductive portion and the second conductive portion, forming a side surface of the mobile communication device;
a printed circuit board (PCB) including a first surface facing the non-conductive portion and a second surface opposite to the first surface;
an antenna array, disposed on the PCB, facing the non-conductive portion of the side member to transmit or receive signals of a millimeter wave frequency band through the non-conductive portion;
a conductive support member located between the front plate and the antenna array;
a conductive element located between the rear plate and the antenna array, and substantially symmetric to the conductive support member; and
a conductive plate located between the front plate and the rear plate, and substantially parallel with the PCB such that the PCB is located between the conductive plate and the side surface and is disposed on the conductive plate, wherein the second surface of the PCB faces the conductive plate, and wherein the conductive element is at least partially separated from the conductive plate.

16. The mobile communication device of claim 15, wherein the antenna array is fully overlapped with the non-conductive portion when viewed in a direction toward the side surface.

17. The mobile communication device of claim 15, further comprising a communication circuit configured to transmit or receive the signals through the antenna array, and wherein the communication circuit is disposed on the second surface.

18. The mobile communication device of claim 15, wherein the antenna array includes a plurality of patch antennas.

19. The mobile communication device of claim 15, wherein the antenna array includes multiple antenna elements arranged in a third direction which is perpendicular to a first direction from the front plate to the rear plate, and is perpendicular to a second direction toward which the first surface faces.

20. The mobile communication device of claim 15, wherein the front plate or the rear plate comprises at least one of glass and polymer.

21. A mobile communication device comprising:

a front plate forming at least a portion of a front surface of the mobile communication device;

a rear plate forming at least a portion of a rear surface of the mobile communication device;

a first conductive portion, a second conductive portion, and a non-conductive portion of a side member forming a side surface of the mobile communication device, the non-conductive portion located between the first conductive portion and the second conductive portion;

a printed circuit board (PCB) including a first surface facing the non-conductive portion and a second surface opposite to the first surface;

an antenna array disposed on the first surface of the PCB, facing the non-conductive portion to transmit or receive signals of a millimeter wave frequency band through the non-conductive portion;

a first conductive region located between the front plate and the antenna array, the first conductive region configured to prevent signals from the antenna array from being transmitted toward the front plate;

a second conductive region located between the rear plate and the antenna array, the second conductive region configured to prevent signals from the antenna array from being transmitted toward the rear plate; and a conductive plate located between the front plate and the rear plate, and substantially parallel with the PCB such that the PCB is located between the conductive plate and the side surface and is disposed on the conductive plate, wherein the second surface of the PCB faces the conductive plate, and wherein the second conductive region is at least partially separated from the conductive plate.

22. The mobile communication device of claim 21, wherein the antenna array is fully overlapped with the non-conductive portion when viewed in a direction toward the side surface.

23. The mobile communication device of claim 21, wherein the first conductive region is substantially symmetric to the second conductive region.

24. The mobile communication device of claim 21, wherein the antenna array includes a plurality of patch antennas.

25. The mobile communication device of claim 21, wherein the front plate or the rear plate comprises at least one of glass and polymer.

26. The mobile communication device of claim 21, wherein the antenna array includes multiple antenna elements arranged in a third direction which is perpendicular to a first direction from the front plate to the rear plate, and is perpendicular to a second direction toward which the first surface faces.

27. The mobile communication device of claim 21, further comprising a communication circuit configured to transmit or receive the signals through the antenna array, and wherein the communication circuit is disposed on the second surface.

* * * * *